United States Patent
Kontomaris

(10) Patent No.: US 12,338,385 B2
(45) Date of Patent: Jun. 24, 2025

(54) USE OF E-1,1,1,4,4,4-HEXAFLUORO-2-BUTENE IN HEAT PUMPS

(71) Applicant: THE CHEMOURS COMPANY FC LLC, Wilmington, DE (US)

(72) Inventor: Konstantinos Kontomaris, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 968 days.

(21) Appl. No.: 14/414,129

(22) PCT Filed: Aug. 1, 2013

(86) PCT No.: PCT/US2013/053119
§ 371 (c)(1),
(2) Date: Jan. 12, 2015

(87) PCT Pub. No.: WO2014/022610
PCT Pub. Date: Feb. 6, 2014

(65) Prior Publication Data
US 2015/0191639 A1    Jul. 9, 2015

Related U.S. Application Data

(60) Provisional application No. 61/678,419, filed on Aug. 1, 2012.

(51) Int. Cl.
C09K 5/04       (2006.01)
F25B 7/00       (2006.01)
F25B 30/02      (2006.01)

(52) U.S. Cl.
CPC ............. C09K 5/045 (2013.01); F25B 7/00 (2013.01); F25B 30/02 (2013.01);
(Continued)

(58) Field of Classification Search
CPC ...... C09K 2205/126; C09K 5/04; F25D 15/00
See application file for complete search history.

(56) References Cited

U.S. PATENT DOCUMENTS

9,217,100 B2 * 12/2015 Kontomaris ........... C09K 5/045
2004/0031948 A1    2/2004 Jannick et al.
(Continued)

FOREIGN PATENT DOCUMENTS

JP    S60-221665    11/1985
JP    2005-257231 A    9/2005
(Continued)

OTHER PUBLICATIONS

Katsuyuki Tanaka, Property of HFO-1336mzz-(E) (trans-1,1,1,4,4,4-Hexafluoro-2-butene), Jul. 2017, Journal of Chemical and Engineering data, 2450-2453.*
(Continued)

*Primary Examiner* — Jianying C Atkisson
*Assistant Examiner* — Meraj A Shaikh

(57) ABSTRACT

Disclosed is a method for producing heating in a heat pump that involves extracting heat from a working fluid comprising E-HFO-1336mzz, in a heat exchanger, thereby producing a cooled working fluid. Also disclosed is a method for producing heating in a heat pump wherein heat is exchanged between at least two cascade stages. Also disclosed is a heat pump apparatus including a working fluid heater, compressor, working fluid cooler and expansion device and said apparatus contains a working fluid comprising E-HFO-1336mzz. Also disclosed is a method for replacing CFC-114, HFC-245fa, HFC-236fa, HCFC-124, HFC-134a, CFC-12 working fluid in a heat pump designed for said working fluid that involves providing a replacement working fluid comprising E-HFO-1336mzz. Also disclosed is a composition containing (i) a working fluid consisting essentially of
(Continued)

E-HFO-1336mzz; and (ii) a stabilizer; or (iii) a lubricant; or both (ii) and (iii).

7 Claims, 3 Drawing Sheets

(52) U.S. Cl.
CPC .... *C09K 2205/126* (2013.01); *C09K 2205/24* (2013.01); *C09K 2205/40* (2013.01); *F25B 2400/121* (2013.01); *Y02B 30/52* (2013.01)

(56) References Cited

U.S. PATENT DOCUMENTS

| | | | |
|---|---|---|---|
| 2008/0069177 A1 | 3/2008 | Minor et al. | |
| 2009/0012335 A1* | 1/2009 | Nappa | B01J 23/868 570/153 |
| 2010/0191013 A1 | 9/2010 | Sato et al. | |
| 2010/0326095 A1 | 12/2010 | Van Horn et al. | |
| 2012/0117990 A1 | 5/2012 | Rached et al. | |
| 2012/0159976 A1* | 6/2012 | Kontomaris | C09K 5/045 62/115 |
| 2012/0216551 A1* | 8/2012 | Minor | C09K 5/045 62/79 |
| 2014/0048739 A1* | 2/2014 | Rached | C08J 9/144 252/67 |

FOREIGN PATENT DOCUMENTS

| | | |
|---|---|---|
| JP | 2007-038468 | 2/2007 |
| JP | 2007/514920 | 6/2007 |
| JP | 2009-008334 | 1/2009 |
| WO | WO 9314175 | 7/1993 |
| WO | WO 2008/039204 | 4/2008 |
| WO | 2011/056824 A2 | 5/2011 |
| WO | 2011/091404 A1 | 7/2011 |
| WO | 2012/069867 | 5/2012 |
| WO | WO 2012/072910 | 6/2012 |

OTHER PUBLICATIONS

International PCT Search Report and Written Opinion mailed Oct. 28, 2013.
Scientific Assessment of Ozone Depletion: 2002, World Meteorological Organization Global Ozone Research and Monitoring Projection—Report No. 47, Chapter 1: Controlled Substances and Other Source Gases, 2002, p. 1.28-1.31.
Chinese Office Action in Application No. 201380039965.5, dated Nov. 16, 2016, 21 pages (with English Translation).
Chinese Office Action in Application No. 201380039965.5, dated Jul. 27, 2017, 4 pages (English translation only).
European Office Action in Application No. 13825428.9, dated Jul. 24, 2017, 4 pages.
Japanese Office Action in Application No. 2015-525574, dated Jul. 25, 2017, 12 pages (English translation only).
Chinese Office Action in Application No. 201380039965.5, dated Nov. 16, 2017, 4 pages (English translation).
Japanese Office Action in Application No. 2015-525574, dated Apr. 3, 2018, 5 pages (English translation).
Japanese Office Action in Appln No. 2019-091798, dated May 19, 2020, 7 pages (with English Translation).

* cited by examiner

USE OF E-1,1,1,4,4,4-HEXAFLUORO-2-BUTENE IN HEAT PUMPS

This application represents a national filing under 35 U.S.C. 371 of International Application No. PCT/US13/53119 filed Aug. 1, 2013, and claims priority of U.S. Provisional Application No. 61/678,419 filed Aug. 1, 2012.

FIELD OF THE INVENTION

This invention relates to methods and systems having utility in numerous applications, and in particular, uses for the compound E 1,1,1,4,4,4-hexafluoro-2-butene (E-HFO-1336mzz) in heat pumps, including high temperature heat pumps.

BACKGROUND OF THE INVENTION

The compositions of the present invention are part of a continued search for the next generation of low global warming potential materials. Such materials must have low environmental impact, as measured by low global warming potential and zero or negligible ozone depletion potential. New heat pump working fluids are needed.

Heating in the range from about 40° C. to about 135° C. is required in a wide range of applications, including space heating, water heating for domestic or other service, food drying, process heating, etc. Presently this heating is mostly provided through heaters using fossil fuels (e.g. heavy oil, natural gas etc.). Thus working fluids that can provide heating in this temperature range or even higher are needed.

SUMMARY OF THE INVENTION

This disclosure relates to heat pump systems and methods using E-HFO-1336mzz as the working fluid to produce heating at temperatures in the range from about 40° C. to about 135° C. with reduced energy costs and reduced greenhouse gas emissions relative to fossil fuel heaters. This disclosure also relates to heat pump systems and methods using E-HFO-1336mzz as the working fluid (e.g. transcritical cycles) to produce heating at temperatures higher than about 140° C. with reduced energy costs and reduced greenhouse gas emissions relative to fossil fuel heaters.

In accordance with the present invention a method for producing heating in a heat pump is provided. The method comprises extracting heat from a working fluid comprising E-HFO-1336mzz, in a heat exchanger, thereby producing a cooled working fluid.

Also in accordance with the present invention a method for producing heating in a cascade heat pump wherein heat is exchanged between at least two heating stages is provided. The method comprises absorbing heat at a selected lower temperature in a first working fluid in a first cascade heating stage and transferring this heat to a second working fluid of a second cascade heating stage that rejects heat at a higher temperature; wherein the second working fluid comprises E-HFO-1336mzz.

Also in accordance with the present invention a heat pump apparatus is provided. The apparatus comprises a working fluid heater (e.g. an evaporator), compressor, working fluid cooler (e.g. a condenser or a supercritical working fluid cooler) and expansion device and said apparatus contains a working fluid comprising E-HFO-1336mzz.

Also in accordance with the present invention a method for replacing CFC-114, HFC-245fa, HFC-236fa, HCFC-124, HFC-134a or CFC-12 working fluid in a heat pump or chiller designed for said working fluid is provided. The method comprises providing a replacement working fluid comprising E-HFO-1336mzz.

Also in accordance with the present invention a method for replacing HCFC-22 working fluid in a heat pump or chiller designed for said working fluid is provided. The method comprises providing a replacement working fluid comprising E-HFO-1336mzz.

Also in accordance with the present invention a method for replacing HFO-1234yf or E-HFO-1234ze or Z-HFO-1234ze or HFO-1243zf working fluid or a working fluid containing HFO-1234yf or E-HFO-1234ze or Z-HFO-1234ze or HFO-1243zf and optionally one or more HFCs or HCs in a heat pump or chiller designed for said working fluid is provided. The method comprises providing a replacement working fluid comprising E-HFO-1336mzz.

Also in accordance with the present invention is provided a method for supplying simultaneous heating and cooling in a cascade heat pump system. The method comprises providing a low temperature cascade stage containing a working fluid selected from the group consisting of $CO_2$, $N_2O$, HFC-32, HFC-125, HFC-143a, HFC-227ea, HFO-1234yf, E-HFO-1234ze, HFO-1243zf, HFC-134a, HFC-134, HFC-161, HFC-152a, and mixtures thereof; and providing a high temperature cascade stage containing a working fluid comprising E-HFO-1336mzz; wherein said low temperature cascade stage and said high temperature cascade stage are in thermal contact.

Also in accordance with the present invention is provided a method for supplying simultaneous heating and cooling in a cascade heat pump system. The method comprises providing a low temperature cascade stage (or cycle) containing a working fluid selected from the group consisting of $NH_3$, $CO_2$, $N_2O$, HFC-32, HFC-125, HFC-143a, HFC-227ea, HFC-227ca, HFC-245cb, HFC-236fa, HFC-236ea, HFO-1234yf, E-HFO-1234ze, HFO-1243zf, E-HFO-1234ye, HFO-1336yf, HFO-1243yf, Z-HFO-1234ze, HCFO-1233xf, HFC-134a, HFC-134, HFC-161, HFC-152a, hydrocarbons, and mixtures thereof; and providing a high temperature cascade stage containing a working fluid comprising E-HFO-1336mzz; wherein said low temperature cascade stage and said high temperature cascade stage are in thermal contact.

Also in accordance with the present invention a composition for use in a heat pump is provided. The composition comprises: (i) a working fluid consisting essentially of E-HFO-1336mzz; and (ii) a stabilizer to prevent degradation at temperatures of 50° C. or above, or (iii) a lubricant suitable for use at 50° C. or above, or both (ii) and (iii).

DETAILED DESCRIPTION OF PREFERRED EMBODIMENTS

Figure 1:
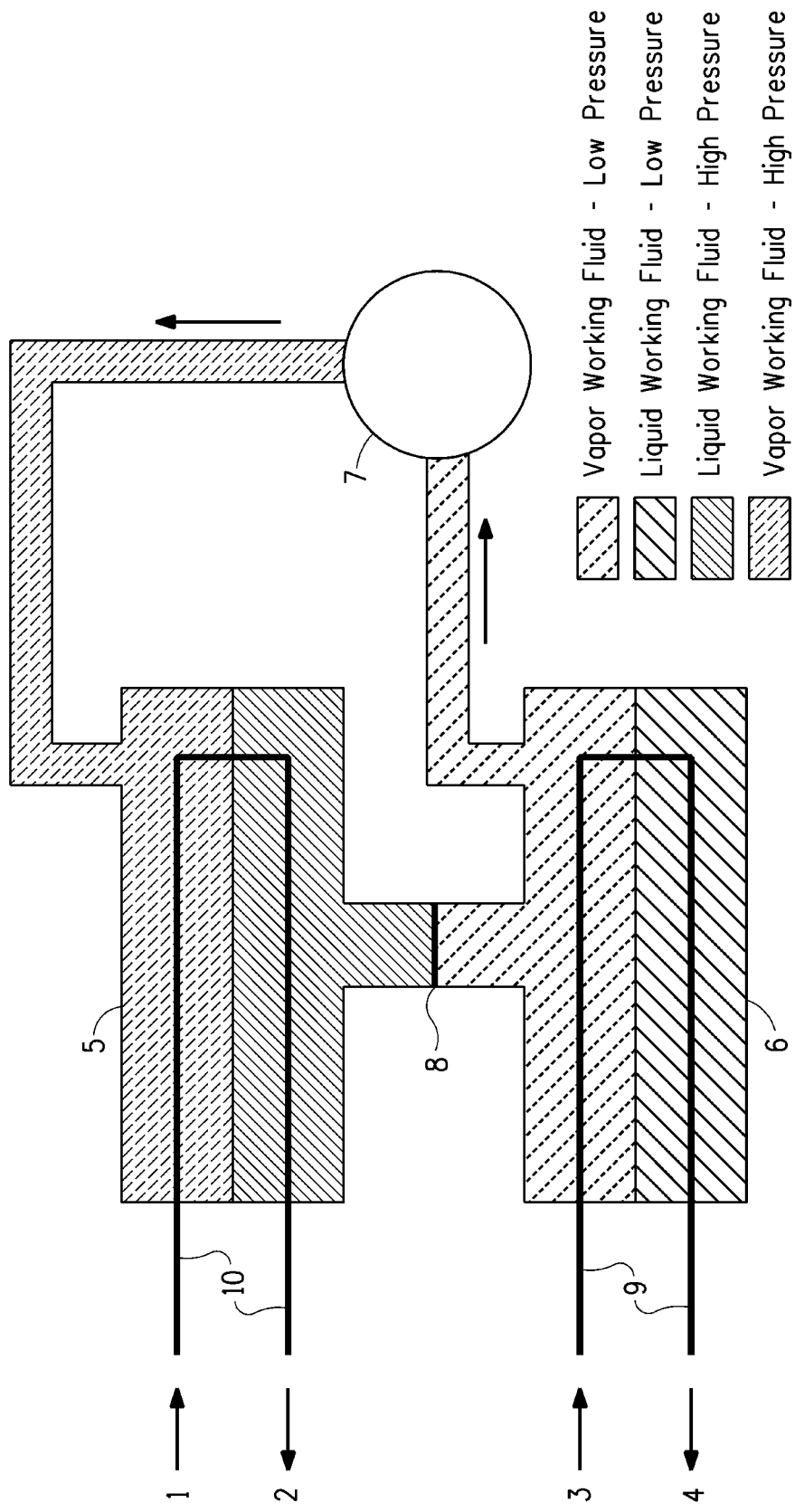
FIG. 1 is a schematic diagram of one embodiment of a flooded evaporator heat pump apparatus which utilizes a composition comprising E-HFO-1336mzz as working fluid.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant in an evaporator per unit mass of refrigerant circulated. Volumetric cooling capacity refers to the amount of heat removed by the refrigerant in the evaporator per unit volume of refrigerant vapor exiting the evaporator. The refrigeration capacity is a measure of the ability of a refrigerant or heat transfer composition to produce cooling. Cooling rate refers to the heat removed by the refrigerant in the evaporator per unit time.

Coefficient of performance (COP) is the amount of heat removed in the evaporator divided by the energy required to operate the compressor. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer medium comprises a composition used to carry heat from a heat source (e.g. from a body to be cooled) to the heat pump working fluid heater (e.g. evaporator) or from the heat pump working fluid cooler (e.g. condenser or a supercritical working fluid cooler) to a body to be heated.

As used herein, a working fluid comprises a compound or mixture of compounds that function to transfer heat in a cycle wherein the working fluid undergoes a phase change from a liquid to a vapor and back to a liquid in a repeating cycle.

Subcooling is the reduction of the temperature of a liquid below that liquid's saturation point for a given pressure. The saturation point is the temperature at which a vapor composition is just completely condensed to a liquid (also referred to as the bubble point). But subcooling continues to cool the liquid to a lower temperature liquid at the given pressure. Subcool amount is the amount of cooling below the saturation temperature (in degrees) or how far below its saturation temperature a liquid composition is cooled.

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition.

As used herein a heat exchanger is a component of a heat pump apparatus wherein heat is transferred. A heat exchanger may be a working fluid cooler, wherein heat is transferred from the working fluid to a heat transfer medium or air for comfort heating or a body to be heated. When the working fluid undergoes condensation during cooling, the working fluid cooler is a condenser. A heat exchanger may be a working fluid heater, wherein heat is transferred to the working fluid. When the working fluid undergoes evaporation during heating, the working fluid heater is an evaporator.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic or novel characteristic(s) of the claimed invention. The term "consisting essentially of" occupies a middle ground between "comprising" and "consisting of".

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" is employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

E-1,1,1,4,4,4-hexafluoro-2-butene (also known as E-HFO-1336mzz or trans-HFO-1336mzz and having the structure E-$CF_3CH$=$CHCF_3$), may be made by methods known in the art, such as by hydrodechlorination of 2,3- dichloro-1,1,1,4,4,4-hexafluoro-2-butene, as described in U.S. Patent Application Publication No. US 2009/0012335 A1, incorporated herein by reference.

Heat Pump Methods

In accordance with this invention, a method for producing heating in a heat pump is provided. The method comprises extracting heat from a working fluid comprising E-HFO-1336mzz, in a heat exchanger, thereby producing a cooled working fluid. In the method the heat exchanger is selected from the group consisting of a working fluid cooler and a working fluid condenser.

In one embodiment of the method for producing heat in a heat pump, the heat pump is a high temperature heat pump wherein the heat exchanger (a working fluid cooler or a working fluid condenser) where heat is extracted from the working fluid is operated at temperatures higher than about 50° C. In another embodiment of the method, the heat exchanger where heat is extracted from the working fluid is operated at temperatures higher than about 75° C. In another embodiment of the method, the heat exchanger where heat is extracted from the working fluid is operated at temperatures higher than about 100° C.

In certain embodiments of the method, the heat exchanger is a condenser. Thus a method is provided for producing heating in a heat pump comprising condensing a vapor working fluid comprising E-HFO-1336mzz, in a condenser, thereby producing a liquid working fluid. Of note are methods wherein a vapor working fluid consisting essentially of E-HFO-1336mzz is condensed. In this conventional cycle the working fluid pressure is kept below the critical pressure of the working fluid throughout the entire cycle.

Of particular utility in the present methods for producing heat are working fluids comprising E-HFO-1336mzz. Of note are working fluids consisting essentially of E-HFO-1336mzz. Also of note are working fluids consisting of E-HFO-1336mzz.

Further, in another embodiment, low GWP working fluids are desirable. Of note are working fluids comprising E-HFO-1336mzz, which have GWP less than 150 that are useful in the methods of the present invention. Also of note are working fluids comprising E-HFO-1336mzz, which have GWP less than 500 that are useful in the methods of the present invention. Also of note are working fluids comprising E-HFO-1336mzz, which have GWP less than 1000 that are useful in the methods of the present invention. Also of note are working fluids comprising E-HFO-1336mzz, which have GWP less than 2000 that are useful in the methods of the present invention.

The method for producing heating may further comprise passing a first heat transfer medium through the heat exchanger, whereby said extraction of heat from the working fluid heats the first heat transfer medium, and passing the heated first heat transfer medium from the heat exchanger to a body to be heated.

In the methods for producing heating in a heat pump a body to be heated may be any space, object, process stream or fluid that may be heated. In one embodiment, a body to be heated may be a room, building, or the passenger compartment of an automobile. Alternatively, in another embodiment, a body to be heated may be a secondary loop fluid, heat transfer medium or heat transfer fluid.

In one embodiment, the first heat transfer medium is water and the body to be heated is water. In another embodiment, the first heat transfer medium is water and the body to be heated is air for space heating. In another embodiment, the first heat transfer medium is an industrial heat transfer liquid and the body to be heated is a chemical process stream. In another embodiment, the first heat transfer medium is water and the body to be heated is air for drying or dehumidification.

In another embodiment of the method for producing heating, the method further comprises expanding the cooled working fluid and heating the expanded cooled working fluid in a heater. In some embodiments, wherein the cooled working fluid is expanded to a pressure below the critical pressure of the working fluid, the heater is an evaporator. Thus, in another embodiment, the method for producing heating further comprises expanding the cooled working fluid and heating the working fluid in an evaporator, thus producing a working fluid vapor.

In yet another embodiment, the method to produce heating further comprises compressing the working fluid vapor in a dynamic (e.g. axial or centrifugal) compressor or a positive displacement (e.g. reciprocating, screw or scroll) compressor. The compression step may compress the working fluid vapor to a pressure below or above the critical pressure of the working fluid. If the compression step compresses the working fluid from a pressure below the critical pressure of the working fluid to a pressure above the critical pressure of the working fluid, then the cycle may be referred to as a trans-critical cycle.

In one embodiment, the heating is produced in a heat pump comprising said heat exchanger, further comprising passing a first heat transfer medium to be heated through said heat exchanger, thus heating the first heat transfer medium. In one embodiment, the first heat transfer medium is air, and is passed from the heat exchanger to a space to be heated. In another embodiment, the first heat transfer medium is a portion of a process stream, and is passed from the heat exchanger back to the process.

In some embodiments, a heat transfer medium may be selected from water or glycol (such as ethylene glycol or propylene glycol). Of particular note is an embodiment wherein the second heat transfer medium is water extracting heat from a body to be cooled such as air for space cooling.

In another embodiment, a heat transfer medium may be an industrial heat transfer liquid, wherein the body to be heated is a chemical process stream, which includes process lines and process equipment such as distillation columns. In another embodiment, a heat transfer medium may be an industrial heat transfer liquid, wherein the body to be heated is a chemical process stream, which includes process equipment such as chemical reactors, dryers, crystallizers, evaporators, boilers and liquid pumps. Of note are industrial heat transfer liquids including ionic liquids, various brines such as aqueous calcium chloride or sodium chloride, glycols such as propylene glycol or ethylene glycol, methanol, ammonia, trichloroethylene, d-limonene, methylene chloride and other heat transfer media such as those listed in section 4 of the 2006 ASHRAE Handbook on Refrigeration.

In one embodiment of this method, the working fluid is heated in a working fluid heater (or heat exchanger) by a second heat transfer medium to form a heated working fluid. The second heat transfer medium is a warm liquid, such as water, which is transported into the working fluid heater from a low temperature heat source. The warm second heat transfer medium is cooled in the working fluid heater and is returned to the low temperature heat source or is passed to a body to be cooled, such as a building. The heated working fluid is then compressed in a compressor to produce a high pressure working fluid. The high pressure working fluid is then cooled in a working fluid cooler by a first heat transfer medium, which is a cooled liquid brought in from the vicinity of a body to be heated (heat sink). In this method a heat pump may also be used to heat domestic or service water or a process stream. In this method a heat pump may also be used to heat water for district heating. In another embodiment, the heat pump is a high temperature heat pump, thus having a working fluid cooler (e.g. condenser) temperature above about 50° C. In yet another embodiment, the heat pump is a high temperature heat pump, thus having a working fluid cooler (e.g. condenser) temperature above about 75° C. In yet another embodiment, the heat pump is a high temperature heat pump, thus having a working fluid cooler (e.g. condenser) temperature above about 100° C.

In another embodiment, of the method for producing heating a liquid working fluid is passed to an evaporator where it is heated by a second liquid heat transfer medium thus being evaporated to produce a heated working fluid vapor. The second liquid heat transfer medium is cooled by heating the working fluid and passed out of the evaporator to a low temperature heat source or a body to be cooled. The heated working fluid vapor is then compressed in a compressor to produce a high pressure working fluid vapor. The high pressure working fluid vapor is then cooled and condensed in a condenser by a first heat transfer medium, which is a cooled liquid brought in from the vicinity of a body to be heated (heat sink) thus forming a cooled working fluid liquid. In this method, a heat pump may also be used to heat domestic or service water or a process stream. In this method a heat pump may also be used to heat water for district heating. In another embodiment the heat pump is a high temperature heat pump, thus having a condenser temperature above about 50° C. In another embodiment, the heat pump is a high temperature heat pump, thus having a working fluid cooler (e.g. condenser) temperature above about 75° C. In yet another embodiment, the heat pump is a high temperature heat pump, thus having a working fluid cooler (e.g. condenser) temperature above about 100° C.

In one embodiment of the method for producing heating, the heat pump includes a compressor which is a dynamic or positive displacement compressor. Dynamic compressors include axial and centrifugal compressors. Positive displacement compressors include reciprocating, screw and scroll.

The conventional heating cycle described above in which the working fluid pressure does not exceed the working fluid critical pressure may be referred to as a sub-critical heating cycle. In a sub-critical heating cycle liquid working fluid is evaporated in the evaporator (a heat exchanger or working fluid heater) and condensed in the condenser (a different heat exchanger or working fluid cooler), thus transitioning between liquid and vapor working fluid repeatedly as the cycle repeats.

In a trans-critical heating cycle the working fluid used in the cycle receives heat (or it can be said to be heated) at a pressure below the critical pressure of the working fluid by evaporating in an evaporator or heat exchanger or working fluid heater (corresponding to the evaporator of a sub-critical cycle). The working fluid vapor is then compressed to a pressure greater than the critical pressure of the working fluid and then cooled without condensation in a second heat exchanger or working fluid cooler (corresponding to the condenser in a sub-critical cycle) thus releasing heat to produce a cooled working fluid. The pressure of this cooled working fluid is reduced below its critical pressure. Thus, the working fluid pressure exceeds its critical pressure for only some portion of (but not throughout) the cycle.

A super-critical heating cycle operates at pressures higher than the critical pressure of the working fluid throughout the entire cycle and involves the following steps: working fluid compression, cooling, expansion and heating.

In another embodiment of the invention, a method for producing heating in a heat pump wherein heat is exchanged between at least two cascade heating stages is provided. The method comprises absorbing heat in a first working fluid at a selected lower temperature in a first cascade heating stage and transferring this heat to a second working fluid of a second cascade heating stage that rejects heat at a higher working fluid temperature; wherein the second working fluid comprises E-HFO-1336mzz. Multiple stage heat pump systems (or cascade heat pump systems) allow low temperature heat to be raised to higher levels by stepping the heat up through more than one cycle or cascade stage.

In another embodiment of the invention a method is provided for raising the maximum feasible working fluid cooler (e.g., condenser) operating temperature in a high temperature heat pump apparatus comprising charging the high temperature heat pump with a working fluid comprising E-HFO-1336mzz. High temperature heat pumps operate at higher working fluid cooler (e.g., condenser) temperatures than comfort heating heat pumps (e.g., residential heat pumps). The maximum feasible operating working fluid cooler (or condenser) temperature is dependent upon the properties of the working fluid used (e.g. temperature at which the rate of fluid chemical decomposition, isomerization or other chemical change becomes unacceptably high; the fluid critical temperature; the fluid saturation pressure versus temperature curve) as well as certain limitations of existing equipment.

Use of a composition comprising E-HFO-1336mzz in heat pumps provides a more environmentally sustainable working fluid, with low GWP (GWP=32) and zero ODP.

Commonly available large tonnage centrifugal heat pump components can accommodate maximum working pressures of up to about 2.18 MPa without major modifications. Therefore if pressures higher than about 2.18 MPa were reached, it would be necessary to modify equipment to handle the higher pressures.

E-HFO-1336mzz would enable condensing temperatures up to about 118.1° C. without exceeding a condensing pressure of 2.18 MPa. Therefore, E-HFO-1336mzz could enable condensing temperatures up to over 118° C. at pressures (lower than 2.18 MPa) feasible with commonly available large centrifugal heat pumps. The condenser temperature achievable with E-HFO-1336mzz without exceeding a condenser pressure of about 2.18 MPa is, therefore, comparable to that achievable with CFC-114 (1,2-dichloro-1,1,2,2-tetrafluoroethane (GWP=10,000), with maximum achievable condenser operating temperature of about 123° C.) and HFC-245fa (1,1,1,3,3-pentafluoropropane (GWP=1030), with maximum achievable condenser operating temperature of about 126° C.).

In another embodiment, use of E-HFO-1336mzz can enable temperatures higher than 118° C. limited by its critical temperature of 137.7° C. with suitable compressors.

In accordance with this invention it is possible to replace a high temperature heat pump fluid (for example, CFC-114, HFC-245fa, HFC-236fa, HCFC-124, HFC-134a, CFC-12) in a system originally designed for said high temperature heat pump fluid with a working fluid comprising E-HFO-1336mzz. Thus is provided a method for replacing CFC-114, HFC-245fa, HFC-236fa, HCFC-124, HFC-134a or CFC-12 working fluid in a high temperature heat pump designed for said working fluid providing a replacement working fluid comprising E-HFO-1336mzz In another embodiment, the method comprises providing a replacement working fluid consisting essentially of E-HFO-1336mzz. In another embodiment, the method comprises providing a replacement working fluid consisting of E-HFO-1336mzz. In one embodiment of the method for replacing CFC-114, HFC-245fa, HFC-236fa, HCFC-124, HFC-134a, CFC-12 working fluid, said heat pump is a high temperature heat pump having a working fluid cooler or condenser operating temperature above about 50° C. In another embodiment of the method the heat pump is a high temperature heat pump having a working fluid cooler or condenser operating temperature above about 75° C. In another embodiment of the method the heat pump is a high temperature heat pump having a working fluid cooler or condenser operating temperature above about 100° C. In accordance with this invention it is possible to replace HCFC-22 (chlorodifluoromethane) in a system originally designed for HCFC-22 with a working fluid comprising E-HFO-1336mzz. Thus, in one embodiment a method is provided for replacing HCFC-22 working fluid in a high temperature heat pump designed for HCFC-22 providing a replacement working fluid comprising E-HFO-1336mzz. In another embodiment, the method comprises providing a replacement working fluid consisting essentially of E-HFO-1336mzz. In another embodiment, the method comprises providing a replacement working fluid consisting of E-HFO-1336mzz.

In another embodiment of the method for replacing HCFC-22, said heat pump is a high temperature heat pump having a working fluid cooler or condenser operating temperature above about 50° C. In another embodiment of the method for replacing HCFC-22, said heat pump is a high temperature heat pump having a working fluid cooler or condenser operating temperature above about 75° C. In yet another embodiment of the method for replacing HCFC-22, said heat pump is a high temperature heat pump having a working fluid cooler or condenser operating temperature above about 100° C.

Also in accordance with the invention a method for replacing a working fluid comprising HFO-1234yf, E-HFO-1234ze, Z-HFO-1234ze or HFO-1243zf and optionally one or more saturated hydrofluorocarbons or hydrocarbons in a heat pump or chiller designed for said working fluid is provided. The method comprises providing a replacement working fluid comprising E-HFO-1336mzz. In another embodiment, the method comprises providing a replacement working fluid consisting essentially of E-HFO-1336mzz. In another embodiment, the method comprises providing a replacement working fluid consisting of E-HFO-1336mzz.

In another embodiment of the method for replacing a working fluid comprising HFO-1234yf, E-HFO-1234ze, Z-HFO-1234ze or HFO-1243zf and optionally one or more saturated hydrofluorocarbons or hydrocarbons in a heat pump or chiller designed for said working fluid, said heat pump is a high temperature heat pump having a working fluid cooler or condenser operating temperature above about 50° C. In another embodiment of the method for replacing a working fluid comprising HFO-1234yf, E-HFO-1234ze, Z-HFO-1234ze or HFO-1243zf and optionally one or more saturated hydrofluorocarbons or hydrocarbons, said heat pump is a high temperature heat pump having a working fluid cooler or condenser operating temperature above about 75° C. In yet another embodiment of the method for replacing a working fluid comprising HFO-1234yf, E-HFO-1234ze, Z-HFO-1234ze or HFO-1243zf and optionally one or more saturated hydrofluorocarbons or hydrocarbons, said heat pump is a high temperature heat pump having a working fluid cooler or condenser operating temperature above about 100° C.

In one embodiment of the method the working fluid being replaced is HFC-236fa, HCFC-124, HFC-134a or CFC-12 and the maximum feasible condensing temperature may be increased above that achievable with said replaced working fluid. In one embodiment, replacing HFC-236fa with E-HFO-1336mzz would increase the feasible condensing temperature from about 105.5° C. to about 118.1° C. without exceeding a condensing pressure of 2.18 MPa. In another embodiment, replacing HCFC-124 with E-HFO-1336mzz would increase the feasible condensing temperature from about 95.5° C. to about 118.1° C. without exceeding a condensing pressure of 2.18 MPa. In another embodiment replacing HFC-134a with E-HFO-1336mzz would increase the feasible condensing temperature from about 71.2° C. to about 118.1° C. without exceeding a condensing pressure of 2.18 MPa. In another embodiment replacing HCFC-22 with E-HFO-1336mzz would increase the feasible condensing temperature from about 55° C. to about 118.1° C. without exceeding a condensing pressure of 2.18 MPa. In another embodiment replacing HFO-1234yf with E-HFO-1336mzz would increase the feasible condensing temperature from about 73° C. to about 118.1° C. without exceeding a condensing pressure of 2.18 MPa. In another embodiment replacing E-HFO-1234ze with E-HFO-1336mzz would increase the feasible condensing temperature from about 84° C. to about 118.1° C. without exceeding a condensing pressure of 2.18 MPa. In another embodiment replacing HFO-1243zf with E-HFO-1336mzz would increase the feasible condensing temperature from about 79.8° C. to about 118.1° C. without exceeding a condensing pressure of 2.18 MPa. In one embodiment of the method for replacing CFC-114, HFC-245fa, HFC-236fa, HCFC-124, HFC-134a or CFC-12 working fluid, a chiller designed for operation with said working fluid may be converted to a heat pump that operates with E-HFO-1336mzz working fluid.

In one embodiment of the method for replacing HCFC-22, a chiller designed for operation with HCFC-22 may be converted to a heat pump that operates with a working fluid comprising E-HFO-1336mzz.

In another embodiment of the method for replacing a working fluid comprising HFO-1234yf, E-HFO-1234ze, Z-HFO-1234ze or HFO-1243zf and optionally one or more saturated hydrofluorocarbons or hydrocarbons in a a chiller designed for operation with said working fluid may be converted to a heat pump that operates with a working fluid comprising E-HFO-1336mzz. In one embodiment, a method for supplying simultaneous heating and cooling in a cascade heat pump system is provided. The method comprises providing a low temperature cascade stage containing a working fluid selected from the group consisting of $NH_3$, $CO_2$, $N_2O$, HFC-32, HFC-125, HFC-143a, HFC-227ea, HFC-227ca, HFC-245cb, HFC-236fa, HFC-236ea, HFO-1234yf, E-HFO-1234ze, HFO-1243zf, E-HFO-1234ye, HFO-1336yf, HFO-1243yf, Z-HFO-1234ze, HCFO-1233xf, HFC-134a, HFC-134, HFC-161, HFC-152a, hydrocarbons, and mixtures thereof; and providing a high temperature cascade stage containing a working fluid comprising E-HFO-1336mzz; wherein said low temperature cascade stage and said high temperature cascade stage are in thermal contact.

In accordance with this invention it is also possible to use a working fluid comprising E-HFO-1336mzz in a system originally designed as a chiller using a conventional chiller working fluid (for example a chiller using HFC-134a or HFC-245fa) for the purpose of converting the system to a heat pump system. For example, a conventional chiller working fluid can be replaced in an existing chiller system with a working fluid comprising E-HFO-1336mzz to achieve this purpose.

In accordance with this invention it is also possible to use a working fluid comprising E-HFO-1336mzz in a system originally designed as a chiller using a chiller working fluid containing an HFO (e.g. HFO-1234yf or E-HFO-1234ze) for the purpose of converting the system to a heat pump system. For example, a chiller working fluid containing an HFO can be replaced in an existing chiller system with a working fluid comprising E-HFO-1336mzz to achieve this purpose.

In accordance with this invention it is also possible to use a working fluid comprising E-HFO-1336mzz in a system originally designed as a comfort heating (i.e., low temperature or residential) heat pump system using a conventional comfort heating heat pump working fluid (for example a heat pump using HFC-134a or HCFC-123 or HFC-245fa) for the purpose of converting the system to a high temperature heat pump system having condenser temperatures at about 50° C. or higher. For example, a conventional comfort heating heat pump working fluid can be replaced in an existing comfort heating heat pump system with a working fluid comprising E-HFO-1336mzz to achieve this purpose.

A composition comprising E-HFO-1336mzz can enable the design and operation of dynamic (e.g. centrifugal) or positive displacement (e.g. screw or scroll) heat pumps for upgrading heat available at low temperatures to meet demands for heating at higher temperatures. The available low temperature heat would be supplied to the evaporator and the high temperature heat would be extracted at the condenser. For example, waste heat could be available to be supplied to the evaporator of a heat pump operating at 25° C. at a location (e.g. a hospital) where heat from the condenser, operating at 85° C., could be used to heat water (e.g. for hydronic space heating or other service).

In some cases heat may be available from various other sources (e.g. waste heat from process streams, geothermal heat or solar heat) at temperatures higher than suggested above, while heating at even higher temperatures may be required. For example, waste heat may be available at 100° C. while heating at 130° C. may be required for an industrial application. The lower temperature heat could be supplied to the working fluid heater (e.g., evaporator) of a dynamic (e.g. centrifugal) or positive displacement heat pump to be uplifted to the desired temperature of 130° C. and be delivered at the condenser.

Heat Pump Apparatus

In one embodiment of the present invention is provided a high temperature heat pump apparatus containing a working fluid comprising E-HFO-1336mzz. Also of note are embodiments wherein the working fluid consists essentially of E-HFO-1336mzz.

A heat pump is a type of apparatus for producing heating and/or cooling. The heat pump comprises a working fluid heater (e.g., evaporator), a compressor, a working fluid cooler (e.g., condenser), and an expansion device. A working fluid circulates through these components in a repeating cycle. Heating may be produced at the working fluid cooler (e.g., condenser) where energy (in the form of heat) is extracted from the working fluid as it is cooled to form cooled working fluid. Cooling may be produced at the working fluid heater (e.g., evaporator) where energy is absorbed to heat (and mostly, evaporate) the working fluid to form heated working fluid (mostly working fluid vapor). The embodiment wherein the working fluid is condensed and evaporated may be referred to as a sub-critical cycle and an apparatus used for such a sub-critical cycle includes an evaporator, a compressor, a condenser, and an expansion device as described above.

In a trans-critical heating cycle the working fluid liquid used in the cycle receives heat in an evaporator and evaporates at a pressure below the critical pressure of the working fluid. Then the heated working fluid vapor is compressed to a pressure above its critical pressure. The working fluid then enters the working fluid cooler as a fluid above its critical pressure and it is cooled (without condensation) to produce a cooled working fluid. After the cooled working fluid has exited the cooler, its pressure is reduced to a pressure below its critical pressure. The working fluid in a trans-critical cycle, therefore, is at a pressure higher than its critical pressure for a portion of the cycle and at a pressure lower than its critical pressure for another portion of the cycle.

In a super-critical heating cycle the working fluid used in the cycle receives heat in a heater at a pressure higher than the critical pressure of the working fluid. The working fluid is then compressed to an even higher pressure and cooled in a cooler thus releasing heat. Then the pressure of the working fluid is reduced to the heater pressure and therefore, the working fluid pressure remains higher than the working fluid critical pressure. Thus the pressure of the working fluid remains higher than its critical pressure throughout the super-critical cycle.

Figure 2:
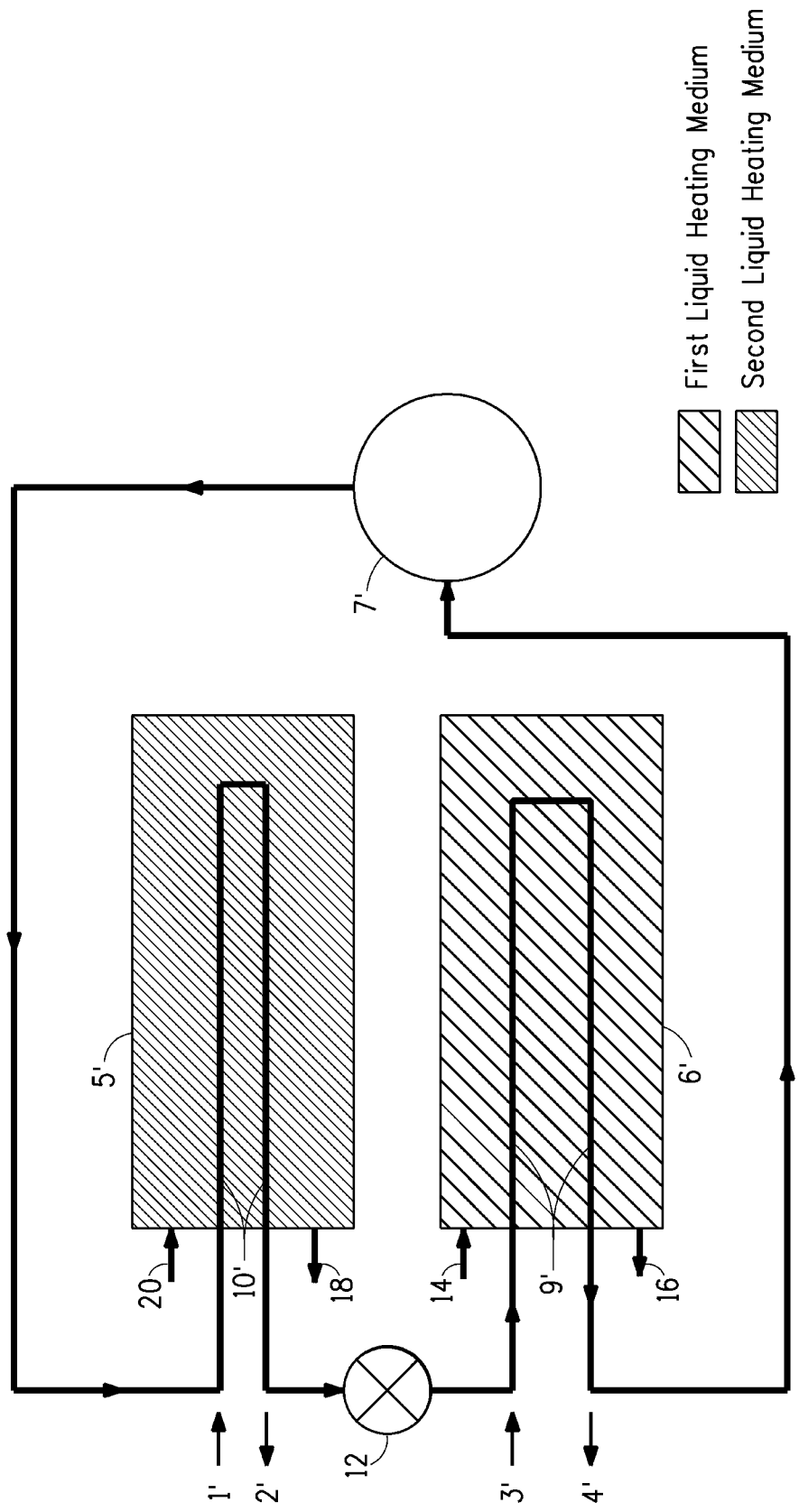
FIG. 2 is a schematic diagram of one embodiment of a direct expansion heat pump apparatus which utilizes a composition comprising E-HFO-1336mzz as working fluid.

Heat pumps may include flooded evaporators, one embodiment of which is shown in FIG. 1, or direct expansion evaporators, one embodiment of which is shown in FIG. 2.

Heat pumps may utilize positive displacement compressors or dynamic compressors. Positive displacement compressors include reciprocating, screw, and scroll compressors. Of note are heat pumps that use screw compressors. Dynamic compressors include axial and centrifugal compressors. Also of note are heat pumps that use centrifugal compressors.

Residential heat pumps are used to produce heated air to warm a residence or home (including single family or multi-unit attached homes) and produce maximum condenser operating temperatures from about 30° C. to about 50° C.

Of note are high temperature heat pumps that may be used to heat air, water, another heat transfer medium or some portion of an industrial process, such as a piece of equipment, storage area or process stream. These high temperature heat pumps can produce maximum working fluid cooler (e.g., condenser) operating temperatures greater than about 50° C. The maximum working fluid cooler (e.g., condenser) operating temperature that can be achieved in a high temperature heat pump will depend upon the working fluid used. This maximum working fluid cooler (e.g., condenser) operating temperature is limited by the normal boiling characteristics of the working fluid and also by the pressure to which the heat pump's compressor can raise the vapor working fluid pressure. This maximum permitted working pressure is also related to the working fluid used in the heat pump.

Of particular value are high temperature heat pumps that operate at working fluid cooler (e.g., condenser) temperatures of at least about 80° C. Compositions comprising E-HFO-1336mzz enable the design and operation of centrifugal heat pumps, operated at working fluid cooler (e.g., condenser) temperatures comparable to or higher than those accessible with many working fluids currently in use. Of note are embodiments using working fluids comprising E-HFO-1336mzz operated at working fluid cooler (e.g., condenser) temperatures up to about 118° C. Also of note are embodiments using working fluids comprising E-HFO-1336mzz operated at working fluid cooler (e.g., condenser)

temperatures up to about 137° C. Also of note are heat pumps that are used to produce heating and cooling simultaneously. For instance, a single heat pump unit may produce hot water for domestic use and may also produce cooling for comfort air conditioning in the summer.

Heat pumps, including both flooded evaporator and direct expansion, may be coupled with an air handling and distribution system to provide comfort air conditioning (cooling and dehumidifying the air) and/or heating to residence (single family or attached homes) and large commercial buildings, including hotels, office buildings, hospitals, universities and the like. In another embodiment, high temperature heat pumps may be used to heat water. In another embodiment, high temperature heat pumps may be used to heat multi-family residential buildings (e.g. high rise apartment buildings).

To illustrate how high temperature heat pumps operate, reference is made to the Figures. A flooded evaporator type heat pump is shown in FIG. 1. In this heat pump a second heat transfer medium, which is a warm liquid, which comprises water, and, in some embodiments, additives, or other heat transfer media such as a glycol (e.g., ethylene glycol or propylene glycol), enters the heat pump carrying heat from a low temperature source, such as a building air handling system or warmed-up water from condensers of a chiller plant flowing to the cooling tower, shown entering at arrow 3, through a tube bundle or coil 9, in an evaporator 6, which has an inlet and an outlet. The warm second heat transfer medium is delivered to the evaporator, where it is cooled by liquid working fluid, which is shown in the lower portion of the evaporator. The liquid working fluid evaporates at a lower temperature than the warm second heat transfer medium which flows through tube bundle or coil 9. The cooled second heat transfer medium re-circulates back to the low temperature heat source as shown by arrow 4, via a return portion of tube bundle or coil 9. The liquid working fluid, shown in the lower portion of evaporator 6 in FIG. 1, vaporizes and is drawn into a compressor 7, which increases the pressure and temperature of the working fluid vapor. The compressor compresses this working fluid vapor so that it may be condensed in a condenser 5 at a higher pressure and temperature than the pressure and temperature of the working fluid vapor when it exits the evaporator. A first heat transfer medium enters the condenser via a tube bundle or coil 10 in condenser 5 from a location where high temperature heat is provided ("heat sink") such as a domestic or service water heater or a hydronic heating system at arrow 1 in FIG. 1. The first heat transfer medium is warmed in the process and returned via a return loop of tube bundle or coil 10 and arrow 2 to the heat sink. This first heat transfer medium cools the working fluid vapor in the condenser and causes the vapor to condense to liquid working fluid, so that there is liquid working fluid in the lower portion of the condenser as shown in FIG. 1. The condensed liquid working fluid in the condenser flows back to the evaporator through an expansion device 8, which may be an orifice, capillary tube or expansion valve. Expansion device 8 reduces the pressure of the liquid working fluid, and converts the liquid working fluid partially to vapor, that is to say that the liquid working fluid flashes as pressure drops between the condenser and the evaporator. Flashing cools the working fluid, i.e., both the liquid working fluid and the working fluid vapor to the saturated temperature at evaporator pressure, so that both liquid working fluid and working fluid vapor are present in the evaporator.

While the description of FIG. 1 above pertains to sub-critical heat pump cycles, embodiments wherein the cycle is a trans-critical heat pump cycle or a super-critical heat pump cycle are intended to fall within the scope of the present invention. In a trans-critical cycle, the condenser would be replaced with a working fluid cooler and the working fluid would be cooled in the cooler without condensation. In a super-critical cycle, the condenser would be replaced with a working fluid cooler and the working fluid would be cooled in the cooler without condensation; and also the evaporator would be replaced with a working fluid heater and the working fluid would be heated in the heater without evaporation. In some embodiments the working fluid vapor is compressed to a supercritical state and vessel 5 in FIG. 1 represents a gas cooler where the working fluid vapor is cooled to a liquid state without condensation.

In some embodiments the second heat transfer medium used in the apparatus depicted in FIG. 1 is chilled water returning from a building where air conditioning is provided or from some other body to be cooled. Heat is extracted from the returning second heat transfer medium at the evaporator 6 and the cooled second heat transfer medium is supplied back to the building or other body to be cooled. In this embodiment the apparatus depicted in FIG. 1 functions to simultaneously cool the second heat transfer medium that provides cooling to a body to be cooled (e.g. building air) and heat the first heat transfer medium that provides heating to a body to be heated (e.g. domestic or service water or process stream).

It is understood that the apparatus depicted in FIG. 1 can extract heat at the evaporator 6 from a wide variety of heat sources including solar, geothermal and waste heat and supply heat from the condenser 5 to a wide range of heat sinks.

It should be noted that for a single component working fluid composition, the composition of the vapor working fluid in the evaporator and condenser is the same as the composition of the liquid working fluid in the evaporator and condenser. In this case, evaporation and condensation will occur at constant temperatures.

One embodiment of a direct expansion heat pump is illustrated in FIG. 2. In the heat pump as illustrated in FIG. 2, liquid second heat transfer medium, which is a warm liquid, such as warm water, enters an evaporator 6' at inlet 14. Mostly liquid working fluid (with a small amount of working fluid vapor) enters a coil 9' in the evaporator at arrow 3' and evaporates. As a result, liquid second heat transfer medium is cooled in the evaporator, and a cooled liquid second heat transfer medium exits the evaporator at outlet 16, and is sent to a low temperature heat source (e.g. warm water flowing to a cooling tower). The working fluid vapor exits the evaporator at arrow 4' and is sent to a compressor 7', where it is compressed and exits as high temperature, high pressure working fluid vapor. This working fluid vapor enters a condenser 5' through a condenser coil or tube bundle 10' at 1'. The working fluid vapor is cooled by a liquid first heat transfer medium, such as water, in the condenser and becomes a liquid. The liquid first heat transfer medium enters the condenser through a condenser heat transfer medium inlet 20. The liquid first heat transfer medium extracts heat from the condensing working fluid vapor, which becomes liquid working fluid, and this warms the liquid first heat transfer medium in the condenser. The liquid first heat transfer medium exits from the condenser through the condenser heat transfer medium outlet 18. The condensed working fluid exits the condenser through lower coil or tube bundle 10' as shown in FIG. 2 and flows through an expansion device 12, which may be an orifice, capillary tube or expansion valve. Expansion device 12 reduces the pressure of the liquid working fluid. A small amount of vapor, produced as a result of the expansion, enters the evaporator with liquid working fluid through coil 9' and the cycle repeats.

In some embodiments the working fluid vapor is compressed to a supercritical state and vessel 5' in FIG. 2 represents a gas cooler where the working fluid vapor is cooled to a liquid state without condensation.

In some embodiments the second heat transfer medium used in the apparatus depicted in FIG. 2 is chilled water returning from a building where air conditioning is provided or from some other body to be cooled. Heat is extracted from the returning second heat transfer medium at the evaporator 6' and the cooled second heat transfer medium is supplied back to the building or other body to be cooled. In this embodiment the apparatus depicted in FIG. 2 functions to simultaneously cool the second heat transfer medium that provides cooling to a body to be cooled (e.g. building air) and heat the first heat transfer medium that provides heating to a body to be heated (e.g. domestic or service water or process stream).

It is understood that the apparatus depicted in FIG. 2 can extract heat at the evaporator 6' from a wide variety of heat sources including solar, geothermal and waste heat and supply heat from the condenser 5' to a wide range of heat sinks.

Compressors useful in the present invention include dynamic compressors. Of note as examples of dynamic compressors are centrifugal compressors. A centrifugal compressor uses rotating elements to accelerate the working fluid radially, and typically includes an impeller and diffuser housed in a casing. Centrifugal compressors usually take working fluid in at an impeller eye, or central inlet of a rotating impeller, and accelerate it radially outward. Some static pressure rise occurs in the impeller section, but most of the pressure rise occurs in the diffuser section, where velocity is converted to pressure. Each impeller-diffuser set is a compressor stage. Centrifugal compressors are built with from 1 to 12 or more compressor stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its tip and is related to the diameter of the impeller and its revolutions per minute. The tip speed required in a specific application depends on the compressor work that is required to elevate the thermodynamic state of the working fluid from evaporator to condenser conditions. The volumetric flow capacity of the centrifugal compressor is determined by the size of the passages through the impeller. This makes the size of the compressor more dependent on the pressure required than the volumetric flow capacity required.

Also of note as examples of dynamic compressors are axial compressors. A compressor in which the fluid enters and leaves in the axial direction is called an axial flow compressor. Axial compressors are rotating, airfoil- or blade-based compressors in which the working fluid principally flows parallel to the axis of rotation. This is in contrast with other rotating compressors such as centrifugal or mixed-flow compressors where the working fluid may enter axially but will have a significant radial component on exit. Axial flow compressors produce a continuous flow of compressed gas, and have the benefits of high efficiencies and large mass flow capacity, particularly in relation to their cross-section. They do, however, require several rows of airfoils to achieve large pressure rises making them complex and expensive relative to other designs.

Compressors useful in the present invention also include positive displacement compressors. Positive displacement compressors draw vapor into a chamber, and the chamber decreases in volume to compress the vapor. After being compressed, the vapor is forced from the chamber by further decreasing the volume of the chamber to zero or nearly zero.

Of note as examples of positive displacement compressors are reciprocating compressors. Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (above 5000 psi or 35 MPa).

Also of note as examples of positive displacement compressors are screw compressors. Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (above 1200 psi or 8.3 MPa).

Also of note as examples of positive displacement compressors are scroll compressors. Scroll compressors are similar to screw compressors and include two interleaved spiral-shaped scrolls to compress the gas. The output is more pulsed than that of a rotary screw compressor.

In one embodiment, the heat pump apparatus may comprise more than one heating circuit (or loop or stage). The performance (coefficient of performance for heating and volumetric heating capacity) of heat pumps operated with E-HFO-1336mzz as the working fluid is drastically improved when the working fluid heater is operated at temperatures approaching the working fluid cooler temperature required by the application.

When heat is available at temperatures relatively close (e.g. within about 50° C.) to the temperature at which heating is required, a single stage (or single loop) heat pump operating with E-HFO-1336mzz may be preferred. For example, heat at 75° C. from a process or a low grade geothermal source may be uplifted with a single stage heat pump operating with E-HFO-1336mzz to meet a heating demand at 118° C.

When the heat available is at temperatures substantially lower than the temperature at which heating is required (e.g., by more than 50° C.), a heat pump with two or more stages in a cascade configuration using E-HFO-1336mzz in the upper cascade stage may be preferred. The low temperature cascade stage (or cycle) would contain a working fluid selected from the group consisting of $NH_3$, $CO_2$, $N_2O$, HFC-32, HFC-125, HFC-143a, HFC-227ea, HFC-227ca, HFC-245cb, HFC-236fa, HFC-236ea, HFO-1234yf, E-HFO-1234ze, HFO-1243zf, E-HFO-1234ye, HFO-1336yf, HFO-1243yf, Z-HFO-1234ze, HCFO-1233xf, HFC-134a, HFC-134, HFC-161, HFC-152a, hydrocarbons (e.g. propane, n-butane, isobutane, pentane, isopentane etc.), and mixtures thereof. The preferred working fluid for the lower temperature cascade stage(s) would depend on the temperature of the available heat source. For low temperature heat sources (e.g. ambient winter air) working fluids with low boiling points (or equivalently high vapor pressures) such as $CO_2$, $N_2O$, HFC-32, HFC-125, HFC-143a, HFC-227ea, HFO-1234yf, E-HFO-1234ze, HFO-1243zf, HFC-134a, HFC-134, HFC-161, HFC-152a and their blends would be advantageous. For example, heat from ambient winter air at −10° C. may be uplifted to produce hot water at 65-85° C. for domestic or other service using a two-stage cascade heat pump with E-HFO-1336mzz in the upper cascade stage and a lower cascade stage working fluid selected from HFC-32, $CO_2$, HFO-1234yf, E-HFO-1234ze, a blend of HFO-1234yf, E-HFO-1234 ze and HFC-32, a non-flammable azeotropic blend of HFO-1234yf and HFC-134a or a non-flammable azeotropic blend of E-HFO-1234ze and HFC-134. Other possible working fluids for the lower cascade stage(s) may include HFO-1234ye (1,2,3,3-tetrafluoropropene, E- or Z-isomer), HFO-1243zf (3,3,3-trifluoropropene), HFC-125 (pentafluoroethane), HFC-143a (1,1,1-trifluoroethane), HFC-152a (1,1-difluoroethane), HFC-227ea (1,1,1,2,3,3,3-heptafluoropropene) and their blends such as HFO-1234yf/HFC-32, HFO-1234yf/HFC-32/HFC-125, HFO-1234yf/HFC-134a, HFO-1234yf/HFC-134a/HFC-32, HFO-1234yf/HFC-134, HFO-1234yf/HFC-134a/HFC-134, HFO-1234yf/HFC-32/HFC-125/HFC-134a, E-HFO-1234ze/HFC-134a, E-HFO-1234ze/HFC-134, E-HFO-1234ze/HFC-134a/HFC-134, E-HFO-1234ze/HFC-227ea, E-HFO-1234ze/HFC-134/HFC-227ea, E-HFO-1234ze/HFC-134/HFC-134a/HFC-227ea, HFO-1234yf/E-HFO-1234ze/HFC-134/HFC-134a/HFC-227ea, HFO-1234yf/HFC-32/E-HFO-1234ze, HFO-1234yf/HFC-32/HFC-125/E-HFO-1234ze, HFO-1234yf/HFC-134a/E-HFO-1234ze, HFO-1234yf/HFC-134a/HFC-32/E-HFO-1234ze, HFO-1234yf/HFC-134/E-HFO-1234ze, HFO-1234yf/HFC-134a/HFC-134/E-HFO-1234ze, HFO-1234yf/HFC-32/HFC-125/HFC-134a/E-HFO-1234ze, HFO-1234yf/HFC-32/HFC-152a/E-HFO-1234ze etc. The low temperature circuit (or low temperature loop or cascade stage) of the cascade cycle receives the available low temperature heat at the evaporator, lifts the received heat to a temperature intermediate between the temperature of the available low temperature heat and the higher temperature of the required heating duty and transfers the heat to the high stage or high temperature circuit (or high temperature loop) of the cascade system at a cascade heat exchanger. Then the high temperature circuit, operated with E-HFO-1336mzz, further lifts the heat received at the cascade heat exchanger to the required working fluid cooler temperature to meet the intended heating duty. The cascade concept can be extended to configurations with three or more circuits lifting heat over wider temperature ranges and using different fluids over different temperature sub-ranges to optimize performance.

Therefore in accordance with the present invention, there is provided a heat pump apparatus having at least two heating stages arranged as a cascade heating system, each stage circulating a working fluid therethrough, wherein heat is transferred to a final stage from the preceding stage and wherein the working fluid of the final stage comprises E-HFO-1336mzz. In another embodiment of the heat pump apparatus having at least two heating stages, the working fluid of the final stage consists essentially of E-HFO-1336mzz. In another embodiment of the heat pump apparatus having at least two heating stages, the working fluid of the final stage consists of E-HFO-1336mzz.

In one embodiment, the lower cascade stage (or lower temperature loop) of a two-stage cascade heat pump operating with a working fluid as described above could provide refrigeration while the higher stage operating with E-HFO-1336mzz could simultaneously provide heating. Thus there is provided a method for supplying simultaneous heating and cooling in a cascade heat pump system comprising providing a low temperature cascade stage containing a working fluid selected from the group consisting of $NH_3$, $CO_2$, $N_2O$, HFC-32, HFC-125, HFC-143a, HFC-227ea, HFC-227ca, HFC-245cb, HFC-236fa, HFC-236ea, HFO-1234yf, E-HFO-1234ze, HFO-1243zf, E-HFO-1234ye, HFO-1336yf, HFO-1243yf, Z-HFO-1234 ze, HCFO-1233xf, HFC-134a, HFC-134, HFC-161, HFC-152a, hydrocarbons, and mixtures thereof; and providing a high temperature cascade stage containing a working fluid comprising E-HFO-1336mzz.

In one embodiment, the lower cascade stage (or lower temperature loop) of a two-stage cascade heat pump operating with a working fluid as described above could provide refrigeration while the higher stage operating with E-HFO-1336mzz could simultaneously provide heating. Thus there is provided a method for supplying simultaneous heating and cooling in a cascade heat pump system comprising providing a low temperature cascade stage containing a working fluid selected from the group consisting of $CO_2$, $N_2O$, HFC-32, HFC-125, HFC-143a, HFC-227ea, HFO-1234yf, E-HFO-1234ze, HFO-1243zf, HFC-134a, HFC-134, HFC-161, HFC-152a and mixtures thereof; and providing a high temperature cascade stage containing a working fluid comprising E-HFO-1336mzz.

Figure 3:
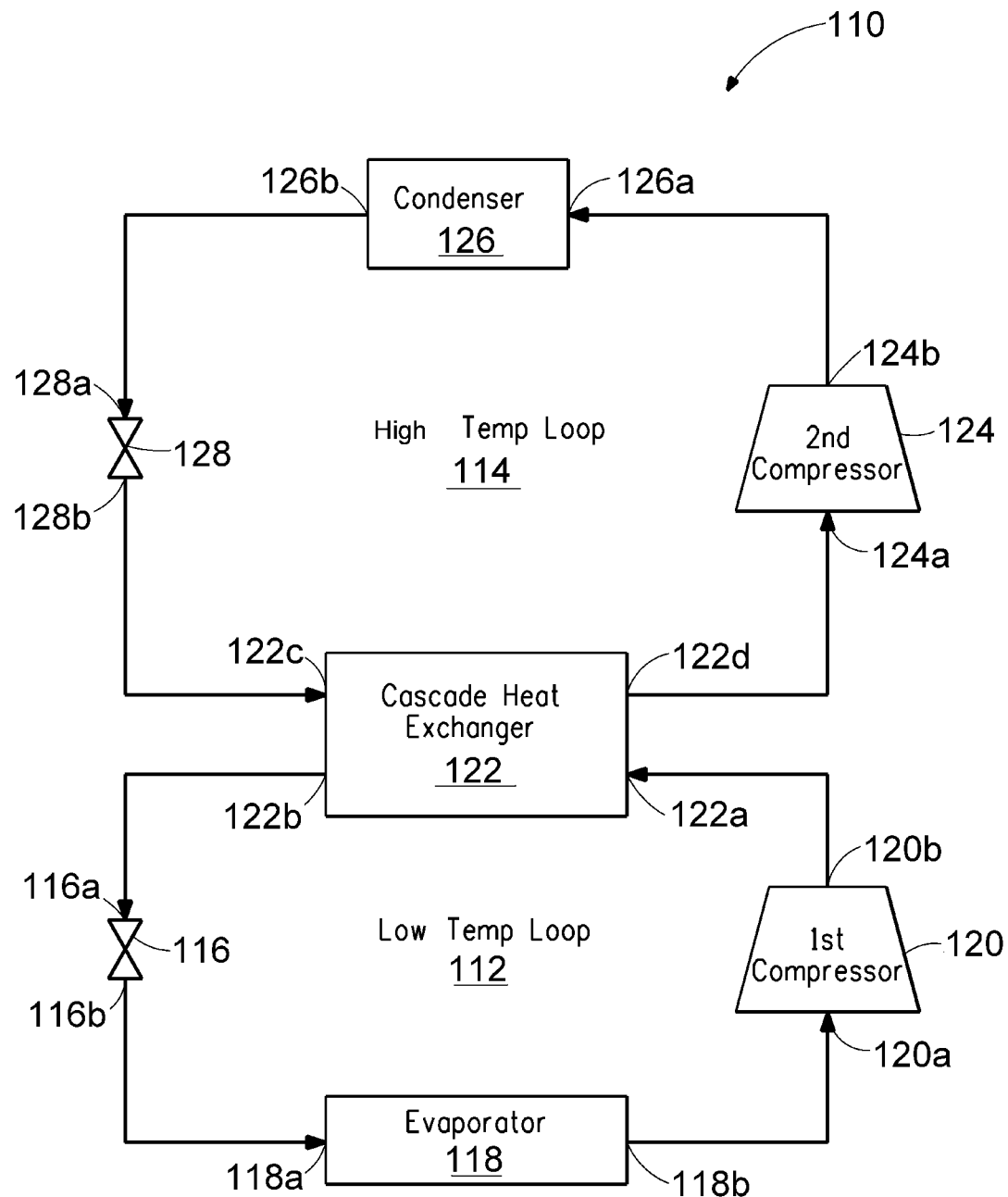
FIG. 3 is a schematic diagram of a cascade heat pump system which uses a composition comprising E-HFO-1336mzz as working fluid.

In accordance with the present invention, there is provided a cascade heat pump system having at least two heating loops for circulating a working fluid through each loop. One embodiment of such a cascade system is shown generally at 110 in FIG. 3. The cascade heat pump system of the present invention has at least two heating loops, including a first, or lower loop 112 as shown in FIG. 3, which is a low temperature loop, and a second, or upper loop 114 as shown in FIG. 3, which is a high temperature loop 114. Each circulates a working fluid therethrough.

As shown in FIG. 3, the cascade heat pump system includes a first expansion device 116. The first expansion device has an inlet 116a and an outlet 116b. The first expansion device reduces the pressure and temperature of a first working fluid liquid which circulates through the first or low temperature loop.

The cascade heat pump system shown in FIG. 3 also includes an evaporator 118. The evaporator has an inlet 118a and an outlet 118b. The first working fluid liquid from the first expansion device enters the evaporator through the evaporator inlet and is evaporated in the evaporator to form a first working fluid vapor. The first working fluid vapor then circulates to the outlet of the evaporator.

The cascade heat pump system shown in FIG. 3 also includes a first compressor 120. The first compressor has an inlet 120a and an outlet 120b. The first working fluid vapor from the evaporator circulates to the inlet of the first compressor and is compressed, thereby increasing the pressure and the temperature of the first working fluid vapor. The compressed first working fluid vapor then circulates to the outlet of the first compressor.

The cascade heat pump system shown in FIG. 3 also includes a cascade heat exchanger system 122. The cascade heat exchanger has a first inlet 122a and a first outlet 122b. The first working fluid vapor from the first compressor enters the first inlet of the heat exchanger and is condensed in the cascade heat exchanger to form a first working fluid liquid, thereby rejecting heat. The first working fluid liquid then circulates to the first outlet of the cascade heat exchanger. The cascade heat exchanger also includes a second inlet 122c and a second outlet 122d. A second working fluid liquid circulates from the second inlet to the second outlet of the cascade heat exchanger and is evaporated to form a second working fluid vapor, thereby absorbing the heat rejected by the first working fluid (as it is condensed). The second working fluid vapor then circulates to the second outlet of the cascade heat exchanger. Thus, in the embodiment of FIG. 3, the heat rejected by the first working fluid is directly absorbed by the second working fluid.

The cascade heat pump system shown in FIG. 3 also includes a second compressor 124. The second compressor has an inlet 124a and an outlet 124b. The second working fluid vapor from the cascade heat exchanger is drawn into the compressor through the inlet and is compressed, thereby increasing the pressure and temperature of the second working fluid vapor. The second working fluid vapor then circulates to the outlet of the second compressor.

The cascade heat pump system shown in FIG. 3 also includes a condenser 126 having an inlet 126a and an outlet 126b. The second working fluid from the second compressor circulates from the inlet and is condensed in the condenser to form a second working fluid liquid, thus producing heat. The second working fluid liquid exits the condenser through the outlet.

The cascade heat pump system shown in FIG. 3 also includes a second expansion device 128 having an inlet 128a and an outlet 128b. The second working fluid liquid passes through the second expansion device, which reduces the pressure and temperature of the second working fluid liquid exiting the condenser. This liquid may be partially vaporized during this expansion. The reduced pressure and temperature second working fluid liquid circulates to the second inlet of the cascade heat exchanger system from the expansion device.

Moreover, in the event that working fluids comprising E-HFO-1336mzz are chemically stable at temperatures higher than their critical temperature, then these working fluids enable the design of heat pumps operated according to a supercritical and/or transcritical cycle in which heat is rejected by the working fluid in a supercritical state and made available for use over a range of temperatures (including temperatures higher than the critical temperature of E-HFO-1336mzz). The supercritical fluid is cooled to a liquid state without passing through an isothermal condensation transition.

For high temperature condenser operation (associated with high temperature lifts and high compressor discharge temperatures) formulations of working fluid (e.g. E-HFO-1336mzz) and lubricants with high thermal stability (possibly in combination with oil cooling or other mitigation approaches) could be advantageous.

For high temperature condenser operation (associated with high temperature lifts and high compressor discharge temperatures) the use of magnetic centrifugal compressors (e.g. Danfoss-Turbocor type) that do not require the use of lubricants could be advantageous.

For high temperature condenser operation (associated with high temperature lifts and high compressor discharge temperatures) the use of compressor materials (e.g. shaft seals, etc) with high thermal stability may also be required.

The compositions comprising E-HFO-1336mzz may be used in a heat pump apparatus in combination with molecular sieves to aid in removal of moisture. Desiccants may be composed of activated alumina, silica gel, or zeolite-based molecular sieves. In some embodiments, the molecular sieves are most useful with a pore size of approximately 3 Angstroms, 4 Angstroms, or 5 Angstroms. Representative molecular sieves include MOLSIV XH-7, XH-6, XH-9 and XH-11 (UOP LLC, Des Plaines, IL).

Heat Pump Compositions

A composition is provided for use in high temperature heat pumps. The composition comprises: (i) a working fluid consisting essentially of E-HFO-1336mzz; and (ii) a stabilizer to prevent degradation at temperatures of 50° C. or above, or (iii) a lubricant suitable for use at 50° C. or above, or both (ii) and (iii). Of note are compositions wherein the working fluid component consists of E-HFO-1336mzz.

The compositions comprising E-HFO-1336mzz may also comprise and/or be used in combination with at least one lubricant selected from the group consisting of polyalkylene glycols, polyol esters, polyvinylethers, mineral oils, alkylbenzenes, synthetic paraffins, synthetic naphthenes, and poly(alpha)olefins.

Useful lubricants include those suitable for use with high temperature heat pump apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

Useful lubricants may also include those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Michigan), polyvinyl ethers (PVEs), and polycarbonates (PCs).

Lubricants are selected by considering a given compressor's requirements and the environment to which the lubricant will be exposed.

Of note are high temperature lubricants with stability at high temperatures. The highest temperature the heat pump will achieve will determine which lubricants are required. In one embodiment, the lubricant must be stable at temperatures of at least 55° C. In another embodiment, the lubricant must be stable at temperatures of at least 75° C. In another embodiment, the lubricant must be stable at temperatures of at least 100° C. In another embodiment, the lubricant must be stable at temperatures of at least 139° C. In another embodiment, the lubricant must be stable at temperatures of at least 145° C. In another embodiment, the lubricant must be stable at temperatures of at least 155° C. In another embodiment, the lubricant must be stable at temperatures of at least 165° C. In another embodiment the lubricant must be stable at temperatures of at least 170° C. In another embodiment the lubricant must be stable at temperatures of at least 200° C.

Of particular note are poly alpha olefin (POA) lubricants with stability up to about 200° C. and polyol ester (POE) lubricants with stability at temperatures up to about 200 to 220° C. Also of particular note are perfluoropolyether lubricants that have stability at temperatures from about 220 to about 350° C. PFPE lubricants include those available from DuPont (Wilmington, DE) under the trademark Krytox®, such as the XHT series with thermal stability up to about 300 to 350° C. Other PFPE lubricants include those sold under the trademark Demnum™ from Daikin Industries (Japan) with thermal stability up to about 280 to 330° C., and available from Ausimont (Milan, Italy), under the trademarks Fomblin® and Galden® such as that available under the trademark Fomblin®-Y Fomblin®-Z with thermal stability up to about 220 to 260° C.

For high temperature working fluid cooler operation (associated with high temperature lifts and high compressor discharge temperatures) formulations of working fluid (e.g. E-HFO-1336mzz) and lubricants with high thermal stability (possibly in combination with oil cooling or other mitigation approaches) will be advantageous. For operation with high temperature lift, multi-stage compression with inter-stage fluid injection (e.g. where part of the liquid refrigerant leaving the condenser is expanded to the intermediate pressure between compression stages to desuperheate the vapors leaving the low compression stage) may be preferred. In one embodiment, the compositions may further comprise from about 0.01 weight percent to about 5 weight percent of a stabilizer, (e.g., a free radical scavenger, an acid scavenger or an antioxidant) to prevent degradation caused at high temperatures. Such other additives include but are not limited to, nitromethane, hindered phenols, hydroxylamines, thiols, phosphites, or lactones. Of note are compositions wherein the compositions comprise from about 0.1 weight percent to about 3 weight percent of a stabilizer. Single stabilizers or combinations may be used.

Optionally, in another embodiment, certain refrigeration, air-conditioning, or heat pump system additives may be added, as desired, to the working fluids as disclosed herein in order to enhance performance and system stability. These additives are known in the field of refrigeration and air-conditioning, and include, but are not limited to, anti-wear agents, extreme pressure lubricants, corrosion and oxidation inhibitors, metal surface deactivators, free radical scavengers, and foam control agents. In general, these additives may be present in the working fluids in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP); Lubrizol 1375 and other members of this family of chemicals may be used in compositions of the present invention. Other anti-wear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areoxalyl bis (benzylidene) hydrazide (CAS reg no. 6629-10-3), N,N'-bis (3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

Of note are stabilizers to prevent degradation at temperatures of 50° C. or above. Also of note are stabilizers to prevent degradation at temperatures of 75° C. or above. Also of note are stabilizers to prevent degradation at temperatures of 85° C. or above. Also of note are stabilizers to prevent degradation at temperatures of 100° C. or above. Also of note are stabilizers to prevent degradation at temperatures of 118° C. or above. Also of note are stabilizers to prevent degradation at temperatures of 137° C. or above.

Of note are stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and iso-decyl diphenyl phosphite, commercially available from Ciba under the trademark Irgafos® DDPP; anisole; 1,4-dimethoxybenzene; 1,4-diethoxybenzene; 1,3, 5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy) methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl) succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

Also of note are ionic liquid stabilizers comprising at least one ionic liquid. Ionic liquids are organic salts that are liquid or have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of [$BF_4$]—, [$PF_6$]—, [$SbF_6$]—, [$CF_3SO_3$]—, [$HCF_2CF_2SO_3$]—, [$CF_3HFCCF_2SO_3$]—, [$HCClFCF_2SO_3$]—, [($CF_3SO_2$)$_2$N]—, [($CF_3CF_2SO_2$)$_2$N]—, [($CF_3SO_2$)$_3$C]—, [$CF_3CO_2$]—, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

The compositions of the present invention can be prepared by any convenient method including mixing or combining the desired amounts. In one embodiment of this invention, a composition can be prepared by weighing the desired component amounts and thereafter combining them in an appropriate container.

EXAMPLES

The concepts described herein will be further described in the following examples, which do not limit the scope of this invention.

Example 1

Heating with a Single-Stage E-HFO-1336mzz Heat Pump Using Waste Heat: $T_{cond}$=85° C.; $T_{evap}$=30° C.

Table 1 summarizes the expected performance of a single-stage heat pump with E-HFO-1336mzz as the working fluid used to provide heating at a condensing temperature of 85° C. using available waste heat supplied to the evaporator operating at 30° C. The heat released at the condenser can be used to meet various heating duties such as hydronic space heating or food drying. The heat supplied to the evaporator may be originating from a chiller plant. Table 1 shows that E-HFO-1336mzz could enable a heat pump for this application with an attractive COP for heating.

TABLE 1

| Working Fluid | E-HFO-1336mzz |
|---|---|
| $T_{cond}$ [° C.] | 85 |
| $T_{evap}$ [° C.] | 30 |
| Vapor Superheat [° C.] | 10 |
| Liquid Subcooling [° C.] | 0 |
| Compressor Efficiency | 0.8 |
| $P_{cond}$ [kPa] | 1,073 |
| Compressor Discharge Temp [° C.] | 87.24 |
| $COP_{heating}$ | 3.960 |
| $CAP_{heating}$ [kJ/m$^3$] | 1,730 |

Example 2

Heating with a Single-Stage E-HFO-1336mzz Heat Pump Using Waste Heat: $T_{cond}$=118° C.; $T_{evap}$=65° C.

Table 2 summarizes the expected performance of a single-stage heat pump with E-HFO-1336mzz as the working fluid used to provide heating at a condensing temperature of 118° C. using available waste heat supplied to the evaporator operating at 65° C. The heat released at the condenser can be used to meet various process heating duties. The heat supplied to the evaporator may be originating from a power generation facility or a low grade geothermal source. Table 2 shows that E-HFO-1336mzz could enable a heat pump for this application with an attractive COP for heating. The condenser pressure remains within the range feasible with commonly available centrifugal heat pumps.

TABLE 2

| Working Fluid | E-HFO-1336mzz |
|---|---|
| $T_{cond}$ [° C.] | 118 |
| $T_{evap}$ [° C.] | 65 |
| Vapor Superheat [° C.] | 10 |
| Liquid Subcooling [° C.] | 0 |
| Compressor Efficiency | 0.8 |
| $P_{cond}$ [kPa] | 2,174 |
| Compressor Discharge Temp [° C.] | 121.68 |
| $COP_{heating}$ | 3.600 |
| $CAP_{heating}$ [kJ/m$^3$] | 3,263 |

Example 3

Heating Water with Heat from Ambient Winter Air Using a Two-Stage (E-HFO-1336mzz; HFC-32) Cascade Heat Pump: $T_{cond}$=65° C.; $T_{evap}$=−10° C.

The performance of a two stage cascade heat pump used to produce hot water for domestic or other service by extracting heat from cold ambient air is summarized in Table 3. The upper cascade stage uses E-HFO-1336mzz as the working fluid. The lower cascade stage uses HFC-32 as the working fluid.

The temperature at which heat is transferred from the lower to the upper cascade stage, $T_{cascade}$, affects the COP for heating and the volumetric heating capacity of the two stages and, therefore, it affects the total COP for heating and the overall equipment cost for a target overall heating capacity. It can be shown that maximization of the total COP for heating, and therefore minimization of operating energy costs is achieved when $T_{cascade}$ is selected so that the two cascade stages have about equal COPs for heating. It is often recommended that $T_{cascade}$ be selected equal to the geometric mean value of $T_{cond}$ and $T_{evap}$:

$$T_{cascade}[°\text{C.}] = \sqrt{\{(T_{cond}[°\text{C.}]+273.15)*(T_{evap}[°\text{C.}]+273.15)\}} - 273.15 \quad (1)$$

For $T_{cond}=65°$ C. and $T_{evap}=-10°$ C., equation (1) leads to $T_{cascade} \sim 25°$ C. Minimization of equipment cost may require a different value for $T_{cascade}$.

TABLE 3

| Upper Cascade Stage | |
|---|---|
| Working Fluid | E-HFO-1336mzz |
| $T_{cond}$ [° C.] | 65 |
| $T_{cascade}$ [° C.] | 25 |
| Compressor Efficiency | 0.8 |
| Vapor Superheat [° C.] | 5 |
| Liquid Subcooling [° C.] | 0 |
| $P_{cond}$ [kPa] | 654 |
| Compressor Discharge Temp [° C.] | 65.39 |
| $COP_{heating\_upper}$ | 5.678 |
| $CAP_{heating\_upper}$ [kJ/m³] | 1,674 |

| Lower Cascade Stage | |
|---|---|
| Working Fluid | HFC-32 |
| $T_{cascade}$ [° C.] | 25 |
| $T_{evap}$ [° C.] | -10 |
| Compressor Efficiency | 0.8 |
| Vapor Superheat [° C.] | 0 |
| Liquid Subcooling [° C.] | 0 |
| $P_{cascade}$ [kPa] | 1,691 |
| Compressor Discharge Temp [° C.] | 69.45 |
| $COP_{heating\_lower}$ | 5.937 |
| $CAP_{heating\_lower}$ [kJ/m³] | 5,069 |
| $COP_{heating\_total}$ | 3.176 |

Table 3 shows that a cascade heat pump using E-HFO-1336mzz in the upper cascade stage and HFC-32 in the lower cascade stage would be able to produce heating at 65° C. with an attractive total COP even during a cold winter day when the temperature of ambient air is only −10° C. The maximum pressure and the compressor discharge temperatures are well within the feasible ranges of commonly available equipment. The working fluid mass flow rate in the lower temperature cascade stage would be equal to about 30.8% of the working fluid mass flow rate in the upper temperature cascade stage.

Example 4

Heating Water with Heat from Ambient Winter Air or Rejected from a Refrigeration System Using a Two-Stage (E-HFO-1336mzz; $CO_2$) Cascade Heat Pump: $T_{cond}=65°$ C.; $T_{evap}=-10°$ C.

The performance of a two stage cascade heat pump used to produce hot water for domestic or other service by extracting heat from cold ambient air is summarized in Table 4. The upper cascade stage uses E-HFO-1336mzz as the working fluid. The lower cascade stage uses $CO_2$ as the working fluid.

TABLE 4

| Upper Cascade Stage | |
|---|---|
| Working Fluid | E-HFO-1336mzz |
| $T_{cond}$ [° C.] | 65 |
| $T_{cascade}$ [° C.] | 21 |
| Compressor Efficiency | 0.8 |
| Vapor Superheat [° C.] | 5 |
| Liquid Subcooling [° C.] | 0 |
| $P_{cond}$ [kPa] | 654 |
| Compressor Discharge Temp [° C.] | 65.22 |
| $COP_{heating\_upper}$ | 5.094 |
| $CAP_{heating\_upper}$ [kJ/m³] | 1,460.95 |

| Lower Cascade Stage | |
|---|---|
| Working Fluid | $CO_2$ |
| $T_{cascade}$ [° C.] | 21 |
| $T_{evap}$ [° C.] | -10 |
| Compressor Efficiency | 0.8 |
| Vapor Superheat [° C.] | 0 |
| Liquid Subcooling [° C.] | 0 |
| $P_{cascade}$ [kPa] | 5,865 |
| Compressor Discharge Temp [° C.] | 61.02 |
| $COP_{heating\_lower}$ | 5.063 |
| $CAP_{heating\_lower}$ [kJ/m³] | 14,813 |
| $COP_{heating\_total}$ | 2.817 |

Table 4 shows that a cascade heat pump using E-HFO-1336mzz in the upper cascade stage and $CO_2$ in the lower cascade stage would be able to produce heating at 65° C. with an attractive total COP even during a cold winter day when the temperature of ambient air is only −10° C. The compressor discharge temperatures are well within the feasible ranges of commonly available equipment. The lower stage pressure is within the feasible range of recently developed $CO_2$ compressors. The use of $CO_2$ in the lower cascade stage offers a lower GWP and a higher volumetric heating capacity than HFC-32. Moreover, $CO_2$ is non-flammable while HFC-32 is classified as a 2 L flammable fluid according to ASHRAE Standard 34.

The lower cascade stage of a two-stage cascade heat pump operating with $CO_2$ as the working fluid could provide refrigeration while the higher stage operating with E-HFO-1336mzz could simultaneously provide heating. The working fluid mass flow rate in the lower temperature cascade stage would be equal to about 47.2% of the working fluid mass flow rate in the upper temperature cascade stage.

Example 5

Heating Water with Heat from Ambient Winter Air Using a Two-Stage (E-HFO-1336mzz; HFO-1234yf/HFC-134a) Cascade Heat Pump: $T_{cond}=65°$ C.; $T_{evap}=-10°$ C.

The performance of a two stage cascade heat pump used to produce hot water for domestic or other service by extracting heat from cold ambient air is summarized in Table 5. The upper cascade stage uses E-HFO-1336mzz as the working fluid. The lower cascade stage uses a non-flammable azeotropic blend containing 55 weight percent HFO-1234yf and HFC-134a as the working fluid.

TABLE 5

| Upper Cascade Stage | |
|---|---|
| Working Fluid | E-HFO-1336mzz |
| $T_{cond}$ [° C.] | 65 |
| $T_{cascade}$ [° C.] | 25 |
| Compressor Efficiency | 0.8 |
| Vapor Superheat [° C.] | 5 |

TABLE 5-continued

| | |
|---|---|
| Liquid Subcooling [° C.] | 0 |
| $P_{cond}$ [kPa] | 654 |
| Compressor Discharge Temp [° C.] | 65.39 |
| $COP_{heating\_upper}$ | 5.678 |
| $CAP_{heating\_upper}$ [kJ/m³] | 1,674 |

| Lower Cascade Stage | |
|---|---|
| Working Fluid | HFO-1234yf/HFC-134a (55/45 wt %) |
| $T_{cascade}$ [° C.] | 25 |
| $T_{evap}$ [° C.] | −10 |
| Compressor Efficiency | 0.8 |
| Vapor Superheat [° C.] | 0 |
| Liquid Subcooling [° C.] | 0 |
| $P_{cascade}$ [kPa] | 709 |
| Compressor Discharge Temp [° C.] | 31.28 |
| $COP_{heating\_lower}$ | 5.998 |
| $CAP_{heating\_lower}$ [kJ/m³] | 1,980.48 |
| $COP_{heating\_total}$ | 3.190 |

Table 5 shows that a cascade heat pump using E-HFO-1336mzz in the upper cascade stage and a 55 weight percent/45 weight percent blend of HFO-1234yf/HFC-134a in the lower cascade stage would be able to produce heating at 65° C. with an attractive total COP even during a cold winter day when the temperature of ambient air is only −10° C. The maximum pressure and the compressor discharge temperatures are well within the feasible ranges of commonly available equipment. The working fluid mass flow rate in the lower temperature cascade stage would be equal to about 60.6% of the working fluid mass flow rate in the upper temperature cascade stage.

Example 6

Chemical Stability of E-HFO-1336mzz at High Temperatures

The chemical stability of E-HFO-1336mzz in the presence of metals was tested according to the sealed tube testing methodology of ANSI/ASHRAE Standard 97-2007. The stock of E-HFO-1336mzz used in the sealed tube tests contained virtually no water or air. Sealed glass tubes, each containing three metal coupons made of steel, copper, and aluminum immersed in E-HFO-1336mzz, were aged in a heated oven at 175° C., 225° C. and 250° C. for 14 days. Visual inspection of the tubes after thermal aging indicated clear liquids with no discoloration or other visible deterioration of the fluid. The concentration of fluoride ion in the aged liquid samples, measured by ion chromatography, was below detection limit (3 ppm) even after two weeks of aging at 250° C. The concentration of fluoride ion can be interpreted as an indicator of the degree of E-HFO-1336mzz degradation. Therefore, E-HFO-1336mzz degradation was minimal. Gas chromatography (GC) analyses of the E-HFO-1336mzz samples after aging for 14 days at 175° C., 225° C. and 250° C. indicated negligible chemical conversion of E-HFO-1336mzz and negligible formation of new compounds.

Example 7

Process Heating with a Transcritical Heat Pump Using E-HFO-1336mzz as the Working Fluid: $T_{cooler}$=150° C.; $T_{evap}$=125° C.

Example 6 established that E-HFO-1336mzz remained chemically stable at temperatures substantially higher than its critical temperature (137.7° C.). Therefore, E-HFO-1336mzz could enable transcritical heat pumps that could deliver heating at temperatures higher than those feasible with subcritical heat pumps operating with E-HFO-1336mzz.

This example summarizes the expected performance of a transcritical heat pump operating with E-HFO-1336mzz as the working fluid. Heat is provided to the evaporator operating at $T_{evap}$=125° C. and a vapor superheat of 20K. The supercritical fluid cooler is operated at a pressure of 4 MPa and an exit temperature of $T_{cooler}$=150° C. The compressor efficiency was specified as 0.7. The compressor discharge temperature would be 170.2° C. E-HFO-1336mzz would remain chemically stable at 170.2° C. However, such high compressor discharge temperatures would require suitable lubricants and materials of compressor construction. The cycle performance would be attractive: COP for heating would be 4.983 and the volumetric heating capacity would be 7,953.7 kJ/m³.

Example 8

Replacing HFC-245fa with E-HFO-1336mzz in a Single-Stage High Temperature Heat Pump: $T_{cond}$=118° C.; $T_{evap}$=65° C.

Table 6 compares the expected performance of a single-stage heat pump with E-HFO-1336mzz as the working fluid to HFC-245fa. The heat pump is used to provide heating at a condensing temperature of 118° C. using available waste heat supplied to the evaporator operating at 65° C. The heat released at the condenser can be used to meet various process heating duties. The heat supplied to the evaporator may be originating from a low grade geothermal source. Table 6 shows that E-HFO-1336mzz would be a near drop-in replacement for HFC-245fa.

TABLE 6

| Working Fluid | E-HFO-1336mzz | HFC-245fa |
|---|---|---|
| $T_{cond}$ [° C.] | 118 | 118 |
| $T_{evap}$ [° C.] | 65 | 65 |
| Vapor Superheat [° C.] | 10 | 10 |
| Liquid Subcooling [° C.] | 20 | 20 |
| Compressor Efficiency | 0.8 | 0.8 |
| $P_{cond}$ [kPa] | 2,174 | 1,853 |
| Compressor Discharge Temp [° C.] | 121.68 | 120.28 |
| $COP_{heating}$ | 5.215 | 5.409 |
| $CAP_{heating}$ [kJ/m³] | 4,726.5 | 4,265.9 |

SELECTED EMBODIMENTS

Embodiment A1

A method for producing heating in a heat pump comprising extracting heat from a working fluid comprising E-HFO-1336mzz, in a heat exchanger, thereby producing a cooled working fluid.

Embodiment A2

The method of Embodiment A1, wherein the heat exchanger is selected from the group consisting of a supercritical working fluid cooler and a condenser.

Embodiment A3

The method of any of Embodiments A1-A2, wherein the heat pump is a high temperature heat pump and the heat exchanger operates at a temperature above about 50° C.

Embodiment A4

The method of any of Embodiments A1-A3, wherein the heat pump is a high temperature heat pump and the heat exchanger operates at a temperature above about 75° C.

Embodiment A5

The method of any of Embodiments A1-A4, wherein the heat pump is a high temperature heat pump and the heat exchanger operates at a temperature above about 100° C.

Embodiment A6

The method of any of Embodiments A1-A5, further comprising passing a first heat transfer medium through the heat exchanger, whereby said extraction of heat heats the first heat transfer medium, and passing the heated first heat transfer medium from the heat exchanger to a body to be heated.

Embodiment A7

The method of any of Embodiments A1-A6, wherein the first heat transfer medium is water and the body to be heated is water.

Embodiment A8

The method of any of Embodiments A1-A6, wherein the first heat transfer medium is water and the body to be heated is air for space heating.

Embodiment A9

The method of any of Embodiments A1-A6, wherein the first heat transfer medium is an industrial heat transfer liquid and the body to be heated is a chemical process stream.

Embodiment A10

The method of any of Embodiments A1-A5 further comprising expanding the working fluid and then heating the working fluid in a second heat exchanger to produce a heated working fluid.

Embodiment A11

The method of Embodiment A10, wherein said second heat exchanger is an evaporator and the heated working fluid is a vapor.

Embodiment A12

The method of any of Embodiments A1-A11, further comprising compressing the working fluid in a dynamic or a positive displacement compressor.

Embodiment A13

The method of Embodiment A12, wherein the dynamic compressor is a centrifugal compressor.

Embodiment A14

The method of any of Embodiments A6-A13, wherein the first heat transfer medium is air and is passed from the heat exchanger to a space to be heated.

Embodiment A15

The method of any of Embodiments A6-A13, wherein the first heat transfer fluid is a portion of a process stream and is passed from the heat exchanger back to the process.

Embodiment B1

A method for producing heating in a heat pump wherein heat is exchanged between at least two stages arranged in a cascade configuration, comprising:
absorbing heat at a selected lower temperature in a first working fluid in a first cascade stage and transferring this heat to a second working fluid of a second cascade stage that supplies heat at a higher temperature; wherein the second working fluid comprises E-HFO-1336mzz.

Embodiment C1

A heat pump apparatus comprising a working fluid heater, compressor, working fluid cooler and expansion device, wherein said apparatus contains a working fluid comprising E-HFO-1336mzz.

Embodiment C2

The method of Embodiment C1, wherein said heat pump is a high temperature heat pump having a working fluid cooler operating temperature above about 50° C.

Embodiment C3

The method of Embodiment C1, wherein the heat pump is a high temperature heat pump and the heat exchanger operates at a temperature above about 75° C.

Embodiment C4

The method of Embodiment C1, wherein the heat pump is a high temperature heat pump and the heat exchanger operates at a temperature above about 100° C.

Embodiment C5

The method of any of Embodiments C1-C4, further comprising compressing the working fluid in a dynamic or a positive displacement compressor.

Embodiment C6

The method of Embodiment C5, wherein the dynamic compressor is a centrifugal compressor.

Embodiment C7

The method of any of Embodiments C1-C6, having at least two stages arranged as a cascade system, each stage circulating a working fluid therethrough, wherein heat is transferred to a final cascade stage from the preceding cascade stage and wherein the working fluid of the final stage comprises E-HFO-1336mzz.

Embodiment C8

The method of Embodiment C1-C7, having at least two stages arranged as a cascade system, each stage circulating a working fluid therethrough comprising:
(a) a first expansion device for reducing the pressure and temperature of a first working fluid liquid;
(b) a working fluid heater having an inlet and an outlet, wherein the first working fluid from the first expansion device enters the working fluid heater through the working fluid heater inlet and is heated in the working fluid heater to form a heated first working fluid, and circulates to the outlet of the working fluid heater;
(c) a first compressor having an inlet and an outlet, wherein the heated first working fluid vapor from the working fluid heater circulates to the inlet of the first compressor and is compressed, thereby increasing the pressure and the temperature of the heated first working fluid producing compressed heated first working fluid, and the compressed heated first working fluid circulates to the outlet of the first compressor;
(d) a cascade heat exchanger system having:
    (i) a first inlet and a first outlet, wherein the heated first working fluid circulates from the first inlet to the first outlet and is cooled in the heat exchanger system to form a cooled first working fluid, thereby rejecting heat, and
    (ii) a second inlet and a second outlet, wherein a second working fluid circulates from the second inlet to the second outlet and absorbs the heat rejected by the first working fluid and forms a heated second working fluid;
(e) a second compressor having an inlet and an outlet, wherein the heated second working fluid from the cascade heat exchanger system is drawn into the compressor and is compressed, thereby increasing the pressure and temperature of the heated second working fluid;
(f) a working fluid cooler having an inlet and an outlet for circulating the heated second working fluid therethrough and for cooling the heated second working fluid from the second compressor to form a cooled second working fluid, thereby supplying heat, wherein the cooled second working fluid exits the working fluid cooler through the outlet; and
(g) a second expansion device for reducing the pressure and temperature of the cooled second working fluid exiting the working fluid cooler and entering the second inlet of the cascade heat exchanger system;
wherein the second working fluid comprises E-HFO-1336mzz.

Embodiment C9

The method of Embodiment C8, wherein the first working fluid comprises at least one fluoroolefin selected from the group consisting of HFO-1234yf, E-HFO-1234ze, E-HFO-1234ye, HFO-1336yf, HFO-1243yf, Z-HFO-1234ze, HCFO-1233xf, and HFC-1243zf.

Embodiment C10

The method of Embodiment C8-C9, wherein the first working fluid comprises at least one fluoroalkane selected from the group consisting of HFC-32, HFC-125, HFC-134a, HFC-134, HFC-143a, HFC-152a, HFC-161, HFC-227ca, HFC-245cb, HFC-236fa, HFC-236ea and HFC-227 ea.

Embodiment C11

The method of Embodiment C8-C10, wherein the first working fluid comprises at least one working fluid selected from hydrocarbons, $NH_3$, $CO_2$ or $N_2O$.

Embodiment C12

The method of Embodiment C8-C11, wherein the working fluid of the cascade stage preceding the final cascade stage comprises at least one fluoroolefin selected from the group consisting of HFO-1234yf, E-HFO-1234ze, E-HFO-1234ye, HFO-1336yf, HFO-1243yf, Z-HFO-1234ze, HCFO-1233xf, and HFC-1243zf.

Embodiment C13

The method of any of Embodiments C7-C12, wherein the working fluid of the cascade stage preceding the final cascade stage comprises at least one fluoroalkane selected from the group consisting of HFC-32, HFC-125, HFC-134a, HFC-134, HFC-143a, HFC-152a, HFC-161, HFC-227ca, HFC-245cb, HFC-236fa, HFC-236ea and HFC-227ea.

Embodiment C14

The method of any of Embodiments C7-C13, wherein the working fluid of the cascade stage preceding the final cascade stage comprises at least one working fluid selected from hydrocarbons, $NH_3$, $CO_2$ or $N_2O$.

Embodiment D1

The method of Embodiment A12 or the apparatus of any of Embodiments C1-C14 wherein said compressor is selected from the group consisting of axial and centrifugal.

Embodiment D2

The method of Embodiment A12 or the apparatus of any of Embodiments C1-C14 wherein said compressor is selected from the group consisting of reciprocating, screw and scroll.

Embodiment D3

The method of any of Embodiments C8-C14, wherein the working fluid heater is an evaporator.

Embodiment E1

A method for replacing CFC-12, CFC-114, HCFC-124, HCFC-22, HFC-134a, HFC-236fa, HFC-245fa, hydrocarbons, HFO-1234yf, E-HFO-1234ze, Z-HFO-1234ze, HFO-1243zf or blends containing HFO-1234yf, E-HFO-1234ze, Z-HFO-1234ze or HFO-1243zf as the working fluid in a heat pump or chiller designed for said working fluid comprising providing a replacement working fluid comprising E-HFO-1336mzz.

Embodiment E2

The method of Embodiment E1, wherein said heat pump is a high temperature heat pump having a working fluid cooler or condenser operating temperature above about 50° C.

Embodiment E3

The method of any of Embodiments E1-E2, wherein the working fluid being replaced is HFC-236fa, HCFC-124, HFC-134a or CFC-12, HCFC-22, HFO-1234yf, E-HFO-1234ze, HFO-1243zf or blends containing HFO-1234yf or E-HFO-1234ze or HFO-1243zf and wherein the maximum feasible condensing temperature is increased above that achievable with said replaced working fluid.

Embodiment E4

The method of any of Embodiments E1-E3, wherein the maximum feasible condensing temperature is increase to about 118° C.

Embodiment E5

The method of Embodiments E1-E4, wherein the chiller designed for said working fluid is converted to a heat pump.

Embodiment F1

A method for supplying simultaneous heating and cooling in a cascade heat pump system comprising providing a low temperature cascade stage containing a working fluid selected from the group consisting of $NH_3$, $CO_2$, $N_2O$, HFC-32, HFC-125, HFC-143a, HFC-227ea, HFC-227ca, HFC-245cb, HFC-236fa, HFC-236ea, HFO-1234yf, E-HFO-1234ze, HFO-1243zf, E-HFO-1234ye, HFO-1336yf, HFO-1243yf, Z-HFO-1234ze, HCFO-1233xf, HFC-134a, HFC-134, HFC-161, HFC-152a, hydrocarbons and mixtures thereof; and providing a high temperature cascade stage containing a working fluid comprising E-HFO-1336mzz; wherein said low temperature cascade stage and said high temperature cascade stage are in thermal contact.

Embodiment G1

A composition comprising: (i) a working fluid consisting essentially of E-HFO-1336mzz; and (ii) a stabilizer to prevent degradation at temperatures of 50° C. or above, or (iii) a lubricant suitable for use at 50° C. or above, or both (ii) and (iii).

Embodiment H1

A method for replacing HCFC-22 working fluid in a heat pump or chiller designed for HCFC-22 working fluid comprising providing a replacement working fluid comprising E-HFO-1336mzz.

Embodiment I1

A method for replacing a working fluid comprising HFO-1234yf, E-HFO-1234ze, Z-HFO-1234ze or HFO-1243zf and optionally one or more saturated hydrofluorocarbons or hydrocarbons in a heat pump or chiller designed for said working fluid comprising providing a replacement working fluid comprising E-HFO-1336mzz.

Embodiment J1

A method for supplying simultaneous heating and cooling in a cascade heat pump system comprising providing a low temperature cascade stage containing a working fluid selected from the group consisting of $NH_3$, $CO_2$, $N_2O$, HFC-32, HFC-125, HFC-143a, HFC-227ea, HFC-227ca, HFC-245cb, HFC-236fa, HFC-236ea, HFO-1234yf, E-HFO-1234ze, HFO-1243zf, E-HFO-1234ye, HFO-1336yf, HFO-1243yf, Z-HFO-1234ze, HCFO-1233xf, HFC-134a, HFC-134, HFC-161, HFC-152a, hydrocarbons, and mixtures thereof; and providing a high temperature cascade stage containing a working fluid comprising E-HFO-1336mzz; wherein said low temperature cascade stage and said high temperature cascade stage are in thermal contact.

What is claimed is:

1. A method for producing heating in a heat pump comprising: extracting heat from a working fluid consisting of E-HFO-1336mzz, in a heat exchanger, thereby producing a cooled working fluid; wherein the heat pump is a high temperature heat pump and the heat exchanger operates at a temperature above 50° C.

2. The method of claim 1 wherein the heat exchanger is selected from the group consisting of a supercritical working fluid cooler and a condenser.

3. The method of claim 1 further comprising passing a first heat transfer medium through the heat exchanger, whereby said extraction of heat heats the first heat transfer medium, and passing the heated first heat transfer medium from the heat exchanger to a body to be heated.

4. The method of claim 1 further comprising expanding the working fluid and then heating the working fluid in a second heat exchanger to produce a heated working fluid.

5. A heat pump apparatus comprising a working fluid heater, compressor, working fluid cooler and expansion device, wherein said apparatus contains a working fluid consisting of E-HFO-1336mzz; wherein the heat pump is a high temperature heat pump and the working fluid cooler operates at a temperature above 50° C.

6. A method for replacing CFC-12, CFC-114, HCFC-124, HCFC-22, HFC-134a, HFC-236fa, HFC-245fa, a hydrocarbon, HFO-1234yf, E-HFO-1234ze, Z-HFO-1234ze, or HFO-1243zf, or blends containing HFO-1234yf, E-HFO-1234ze, Z-HFO-1234ze or HFO-1243zf as the working fluid in a heat pump or chiller designed for said working fluid comprising providing a replacement working fluid consisting of E-HFO-1336mzz; wherein said heat pump or chiller has a working fluid cooler or condenser operating temperature above 50° C.

7. The method of claim 6 wherein the working fluid being replaced is HFC-236fa, HCFC-124, HFC-134a, CFC-12, HCFC-22, HFO-1234yf, E-HFO-1234ze, or HFO-1243zf, or blends containing HFO-1234yf or E-HFO-1234ze or HFO-1243zf and wherein the maximum feasible condensing temperature is increased to 118° C.

* * * * *